(12) United States Patent
Fink

(10) Patent No.: US 9,847,745 B1
(45) Date of Patent: Dec. 19, 2017

(54) SIMULATION OF A FIELD-ORIENTED STATOR VOLTAGE OF A STATOR OF AN ASYNCHRONOUS MACHINE STEADILY REQUIRED DURING OPERATION

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/890,539

(22) PCT Filed: May 16, 2014

(86) PCT No.: PCT/EP2014/060150
§ 371 (c)(1),
(2) Date: Nov. 11, 2015

(87) PCT Pub. No.: WO2014/187751
PCT Pub. Date: Nov. 27, 2014

(30) Foreign Application Priority Data

May 21, 2013 (DE) .................. 10 2013 209 319
May 21, 2013 (DE) .................. 10 2013 209 330
(Continued)

(51) Int. Cl.
*H02P 21/00* (2016.01)
*H02P 21/14* (2016.01)
*H02P 23/00* (2016.01)

(52) U.S. Cl.
CPC .......... *H02P 23/0022* (2013.01); *H02P 21/14* (2013.01)

(58) Field of Classification Search
CPC .................. H02P 21/00; H02P 21/14
See application file for complete search history.

(56) References Cited

U.S. PATENT DOCUMENTS

| 4,442,393 | A | * | 4/1984 | Abbondanti | ............ | H02P 21/00 |
| | | | | | | 318/802 |
| 6,316,905 | B1 | * | 11/2001 | Depenbrock | ........... | H02P 21/04 |
| | | | | | | 318/722 |

(Continued)

FOREIGN PATENT DOCUMENTS

| AT | 511 134 A2 | 9/2012 |
| DE | 42 09 305 A1 | 9/1993 |

(Continued)

OTHER PUBLICATIONS

Bostan, V., Cuibus, M., Has, C., Magureanu, R.: High performance sensorless solutions for induction motor control. Power Electronics Specialist Conference, 2003, vol. 2, 556-561. IEEE.
International Search Report corresponding to PCT Application No. PCT/EP2014/060150, dated Feb. 12, 2015, (German and English language document) (7 pages).
(Continued)

*Primary Examiner* — Eduardo Colon Santana
*Assistant Examiner* — Said Bouziane
(74) *Attorney, Agent, or Firm* — Maginot, Moore & Beck LLP

(57) ABSTRACT

A method for simulating a field-oriented stator voltage of a stator of an asynchronous machine required in the steady state during operation using a model, wherein the asynchronous machine is operated without a rotary encoder, in a field-oriented manner and with a graduated voltage, includes providing a field-oriented detected stator voltage. The method further includes providing a field-oriented detected stator current. The method further includes simulating the field-oriented stator voltage required in the steady state during operation on the basis of the field-oriented detected stator voltage and the field-oriented detected stator current.

9 Claims, 17 Drawing Sheets

(30) Foreign Application Priority Data

| May 21, 2013 | (DE) | 10 2013 209 331 |
|---|---|---|
| May 21, 2013 | (DE) | 10 2013 209 334 |
| May 21, 2013 | (DE) | 10 2013 209 335 |
| May 21, 2013 | (DE) | 10 2013 209 347 |

(56) References Cited

U.S. PATENT DOCUMENTS

| 6,388,419 | B1 | 5/2002 | Chen et al. | |
| 6,718,273 | B1* | 4/2004 | Tschentscher | H02P 21/06 |
| | | | | 324/177 |
| 2010/0276929 | A1* | 11/2010 | Jansen | G01K 7/42 |
| | | | | 290/44 |
| 2014/0346983 | A1* | 11/2014 | Kato | H02P 21/0089 |
| | | | | 318/400.02 |

FOREIGN PATENT DOCUMENTS

| DE | 42 12 726 A1 | 12/1993 |
| DE | 195 31 771 A1 | 3/1997 |
| DE | 196 46 457 A1 | 5/1998 |
| DE | 199 10 608 A1 | 9/2000 |
| DE | 100 11 295 A1 | 9/2001 |
| DE | 102 19 826 A1 | 11/2003 |
| EP | 1 037 377 A2 | 9/2000 |

OTHER PUBLICATIONS

Bostan, V. et al., High performance sensorless solutions for induction motor control, IEEE, 2013, pp. 556-561.

* cited by examiner

SIMULATION OF A FIELD-ORIENTED STATOR VOLTAGE OF A STATOR OF AN ASYNCHRONOUS MACHINE STEADILY REQUIRED DURING OPERATION

This application is a 35 U.S.C. §371 National Stage Application of PCT/EP2014/060150, filed on May 16, 2014, which claims the benefit of priority to Serial Nos., DE 10 2013 209 347.0, filed on May 21, 2013, DE 10 2013 209 334.9, filed on May 21, 2013, DE 10 2013 209 319.5, filed on May 21, 2013, DE 10 2013 209 331.4, filed on May 21, 2013, DE 10 2013 209 330.6, filed on May 21, 2013, and DE 10 2013 209 335.7, filed on May 21, 2013 in Germany, the disclosures of which are incorporated herein by reference in their entirety.

The disclosure relates to a method and an apparatus or apparatuses for controlling an asynchronous machine without a rotary encoder and in a field-oriented manner.

BACKGROUND

It is known from the art that an asynchronous machine can be controlled or managed by means of a control system or management system operating in a field-oriented manner. The control system usually operates on the basis of a detection of a stator current of a stator of the asynchronous machine, a stator voltage of the stator and a rotor position and/or a rotor rotational speed of a rotor of the asynchronous machine.

It is likewise known that the asynchronous machine can be controlled without a rotary encoder by means of a field-oriented control system which is free of a rotary encoder and which can operate in a manner free of direct detection of the rotor position and/or the rotor rotational speed. Management of the asynchronous machine without a rotary encoder can dispense with the provision of an expensive rotary encoder, for example, such that the asynchronous machine can be manufactured cost-effectively and compactly.

DE 196 46 457 A1 and DE 42 09 305 C2 describe methods for the field-oriented control of an asynchronous machine without a rotary encoder.

DE 42 09 305 A1 describes a method and a device for the field-oriented control of asynchronous machines with dynamically high-quality detection of the stator voltages thereof required in the electrically settled state.

DE 195 31 771 A1 describes a method and an apparatus for determining a rotational speed of an encoderless rotating-field machine operated in a field-oriented manner.

DE 102 19 826 A1 describes a method and an apparatus for the field-oriented control of a permanent magnet synchronous machine.

SUMMARY

The disclosure provides a method for simulating a field-oriented stator voltage of a stator of an asynchronous machine required in the steady state during operation by means of a model, in particular a machine model, wherein the asynchronous machine is operated without a rotary encoder, in a field-oriented manner and with a graduated voltage, comprising providing a field-oriented detected stator voltage, providing a field-oriented detected stator current, and simulating the field-oriented stator voltage required in the steady state during operation on the basis of the field-oriented detected stator voltage and the field-oriented detected stator current.

By means of the method according to the disclosure, a field-oriented stator voltage of a stator of the asynchronous machine required in the steady state during operation of the asynchronous machine can be simulated or modeled using a machine model that electrically describes the asynchronous machine. In this case, the simulated stator voltage required in the steady state can correspond to a space vector of a stator voltage which is to be fed to the stator and which may be necessary for maintaining a space vector of an instantaneously present stator current flowing in the stator. For the simulation to be carried out, values of an actually present field-oriented stator voltage and of a field-oriented stator current can be used, which for example can be provided as input values for the method or can be detected or measured in an initial method step of the method according to the disclosure by means of a suitable sensor.

As a result, the method can be carried out particularly simply and enable an exact simulation or modeling of the field-oriented stator voltage required in the steady state during operation.

In particular, it is possible to use the determined simulated field-oriented stator voltage required in the steady state during operation for a reference variable generator and/or for a disturbance variable injection for a setpoint stator current in a control of a field-oriented stator current of the asynchronous machine in order to significantly improve an efficiency and accuracy of a field-oriented control of a rotational speed and/or of a torque of a rotor of the asynchronous machine without a rotary encoder.

The method can furthermore comprise integrating the field-oriented detected stator voltage over a time with a normalization constant that can be indicative of a stator inductance of the stator, and subtracting the field-oriented detected stator current from the integrated field-oriented stator voltage in order to generate a field-oriented differential current, wherein simulating the field-oriented stator voltage, required in the steady state during operation can be carried out on the basis of the field-oriented differential current. This measure can enable a suitable combination of the field-oriented detected stator voltage and the field-oriented detected stator current.

The method can furthermore comprise amplifying the field-oriented differential current with an adjustable gain parameter, and subtracting the amplified field-oriented differential current from the field-oriented detected stator voltage prior to integrating the field-oriented detected stator voltage in order to generate a field-oriented differential current, wherein integrating the field-oriented detected stator voltage can comprise integrating the field-oriented differential voltage. As a result, a feedback of the processed field-oriented detected stator voltage and of the field-oriented detected stator current to the initial variables can take place in the simulation, such that a low-pass filter transfer function used in the simulation of the field-oriented stator voltage required in the steady state during operation can take account of an equivalent circuit diagram underlying the asynchronous machine in field-oriented coordinates.

The method can furthermore comprise integrating the field-oriented differential current over a time with an adjustable further normalization constant, and subtracting the field-oriented integrated differential current from the field-oriented detected stator voltage prior to integrating the field-oriented detected stator voltage in order to generate a or the abovementioned field-oriented differential voltage, wherein integrating the field-oriented detected stator voltage can comprise integrating the field-oriented differential voltage. This measure can likewise bring about a feedback of the variables processed in the simulation of the field-oriented stator voltage required in the steady state during operation with the initial variables provided and can take account of the corresponding equivalent circuit diagram of the asynchronous machine in the field-oriented coordinate system.

A time scale on which the field-oriented stator voltage required in the steady state during operation can be simulated can be chosen to be smaller than a time scale on which a field-oriented stator current of the stator can be controlled using the simulated field-oriented stator voltage required in the steady state during operation. As a result, an equality of the simulated stator voltage required in the steady state during operation and the actually present field-oriented stator voltage required in the steady state, in the case of rapid changes in the field-oriented stator voltages required in the steady state, can be achieved dynamically with very good accuracy. In particular, suitably choosing the time scales can be carried out by means of adjusting the adjustable normalization constant and the adjustable gain parameter.

In particular, the variables mentioned in the application, such as, for example, the stator voltage, the stator current and the stator voltage required in the steady state, can represent space vectors in the stator-oriented coordinate system, in the field-oriented coordinate system and/or in a simulated field-oriented coordinate system. In this case, the method according to the disclosure can be carried out using values of said variables and/or can take account of a time-dependent profile of said variables in which a multiplicity of the corresponding values can be considered.

The disclosure furthermore relates to a simulation apparatus for simulating a field-oriented stator voltage of a stator of an asynchronous machine required in the steady state during operation by means of a model, in particular a machine model, wherein the asynchronous machine is operable without a rotary encoder, in a field-oriented manner and with a graduated voltage, comprising a unit for providing a field-oriented detected stator voltage, a unit for providing a field-oriented detected stator current, and a simulation unit for simulating the field-oriented stator voltage required in the steady state during operation on the basis of the field-oriented detected stator voltage and the field-oriented detected stator current. The simulation apparatus can be designed for carrying out the method described above and have corresponding units. The unit for providing the respective variable can be embodied in particular as a sensor for detecting the respective variable or as an interface for receiving the respective variable. The simulation unit can be part of a processing unit, in particular of a processor, and/or can be realized by means of integration, amplifying, addition and/or subtraction units or components.

The disclosure furthermore relates to a control system for the field-oriented control—without a rotary encoder—of a rotational speed and/or of a torque of a rotor of an asynchronous machine which is operable by means of a graduated voltage and which comprises the simulation apparatus described above.

The disclosure furthermore relates to an arrangement, in particular a drive, comprising an asynchronous machine, a voltage source designed for outputting a graduated voltage to the asynchronous machine, and the control system described above. The voltage source can be designed, in particular, for adjusting the output voltage that can be fed to the asynchronous machine in a stepped manner or in steps and/or can be embodied as a battery direct inverter.

The embodiments described with reference to one of the methods, one of the apparatuses, one of the control systems, one of the arrangements and/or the use also apply to the respective other subjects.

BRIEF DESCRIPTION OF THE DRAWINGS

The disclosure is explained by way of example below on the basis of preferred exemplary embodiments with reference to the appended drawings.

In the figures.

DETAILED DESCRIPTION

Figure 1:
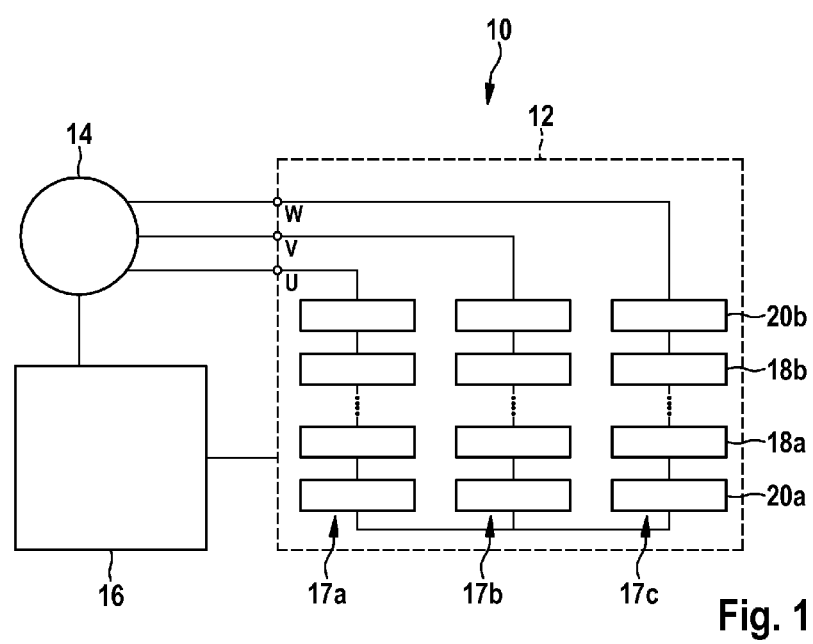
FIG. 1 shows a schematic block illustration of an arrangement comprising an asynchronous machine that is operable by means of a stepped-adjustable and/or graduated voltage and a control system for the field-oriented control of a rotational speed of the asynchronous machine without a rotary encoder.

An arrangement 10 shown in FIG. 1 comprises a voltage source 12, which is embodied as a battery direct inverter and by means of which an asynchronous machine 14 embodied as a squirrel cage rotor is operable. A control system 16 of the arrangement 10 serves for the field-oriented control of a rotational speed and/or of a torque of a rotor of the asynchronous machine 14 without a rotary encoder. The arrangement 10 is part of an electric drive that can be used in steady-state and/or static installations, such as, for example, in a wind turbine, or in a vehicle, for example in a hybrid or electric vehicle. The arrangement 10 can also be part of a transaction drive.

The voltage source 12 is embodied with three voltage branches 17a, 17b, 17c, the stepped scalable, adjustable and/or graduated output voltages of which can be fed to the asynchronous machine 14 via a respective positive pole U, V, W. Each voltage branch 17a, 17b, 17c is provided with a multiplicity of battery modules with coupling devices, which are designated only in the voltage branch 17c with the reference signs 18a and 18b, respectively, for the sake of clarity. Optional disconnecting devices 20a and optional charging and disconnecting devices 20b of the voltage branches 17a, 17b, 17c are respectively coupled to a battery module 18a and 18b of the voltage branches 17a, 17b, 17c. Negative poles of the battery direct inverter 12 are connected to form a star point, but can also be electrically isolated from one another. Although the voltage source 12 is embodied as rechargeable and constitutes a rechargeable battery or a rechargeable battery system, the voltage source 12 is referred to as a battery or as a battery system in accordance with customary linguistic usage.

The control system 16 in accordance with a first exemplary embodiment is described in greater detail below and designated by the reference sign 1016.

Figure 2:
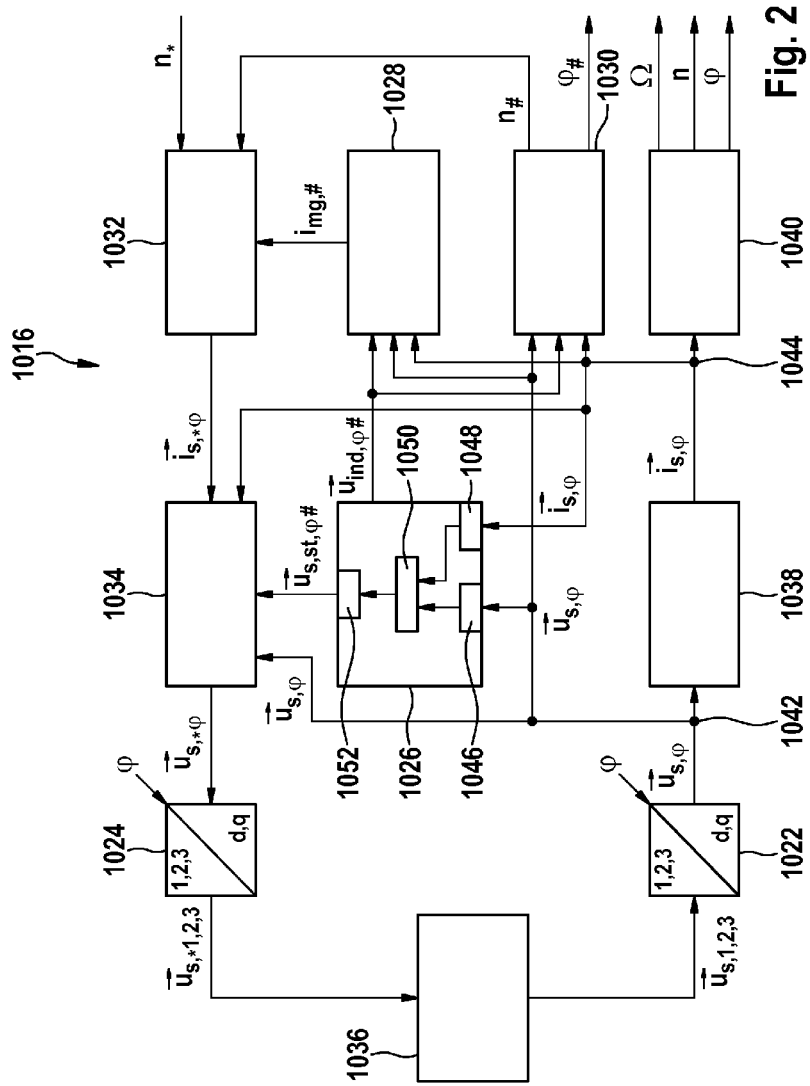
FIG. 2 shows a schematic block illustration of the control system in FIG. 1 in accordance with a first exemplary embodiment comprising a first simulation apparatus for simulating a field-oriented stator voltage required in the steady state in accordance with one exemplary embodiment.

The control system 1016 illustrated in FIG. 2 comprises a first and second Park transformation unit 1022, 1024 for transforming values of a vectorial variable between a stator-oriented coordinate system, which is defined by means of mutually orthogonal coordinate axes 1, 2, 3 and a field-oriented coordinate system, which is defined by means of mutually orthogonal coordinate axes d, q, using a field angle $\phi$. The control system 1016 furthermore comprises a first simulation apparatus 1026 for simulating a field-oriented stator voltage $u_{ind,\phi\#}$ induced on account of a rotor flux $\Psi_r$ of the rotor in a stator of the asynchronous machine 14 by means of a machine model and for simulating a simulated field-oriented stator voltage $u_{s,st,\phi\#}$ required in the steady state during operation of the asynchronous machine 14 by means of the machine model. A second simulation apparatus 1028 of the control system 1016 is designed for simulating a field-oriented magnetization current $i_{mg,\#}$ of the rotor of the asynchronous machine 14 by means of the machine model, and a third simulation apparatus 1030 of the control system 1016 is designed for simulating a rotational speed n# of the rotor of the asynchronous machine 14 by means of the machine model. The first, second and third simulation apparatuses 1026, 1028, 1030 operate in a simulated or modeled coordinate system defined by means of mutually orthogonal coordinate axes d#, q#.

Furthermore, the control system 1016 comprises a rotational speed control apparatus 1032 operating in a field-oriented manner and serving for controlling the rotational speed n of the rotor of the asynchronous machine 14 by means of a magnetization current control which is implemented in the rotational speed control apparatus 1032 and operates in a field-oriented manner and serves for controlling a magnetization current $i_{mg}$ of the rotor of the asynchronous machine 14, and a stator current control apparatus 1034 operating in a field-oriented manner and serving for controlling the current $i_{s,\phi}$ of the stator of the asynchronous machine 14 that flows in the stator. The graduated output voltage that can be output by the battery direct inverter 12 is controllable via an actuator 36 of the control system 1016, which output voltage can be fed in at machine terminals of the asynchronous machine 14. A stator current control section 1038 of the control system 1016, which section serves for controlling a field-oriented stator current $i_{s,\phi}$ and a rotational speed control section 1040 of the control system 1016, which section serves for controlling the magnetization current $i_{mg}$ and the rotational speed n of the rotor of the asynchronous machine 14, model the asynchronous machine 14 by means of the corresponding relationships between respective input variables and output variables of the control sections 1038, 1040. A first sensor 1042 for detecting a field-oriented stator voltage $u^{s,\phi}$ of the stator of the asynchronous machine 14 and a second sensor 1044 for detecting a field-oriented stator current $i_{s,\phi}$ of the stator are in each case coupled to the first, second and third simulation apparatuses 1026, 1028, 1030. The stator current control apparatus 1034 can furthermore be coupled to the first sensor 1042 and the second sensor 1044.

Although the sensors 1042, 1044 are illustrated in terms of circuitry in a manner showing that the sensors 1042, 1044 are designed for detecting the field-oriented variables, it goes without saying that the first and second sensors 1042, 1044 detect space vectors of the respective variable in the stator-oriented coordinate system which are converted into space vectors of the corresponding variables in the field-oriented coordinate system by means of the transformation unit 1022.

The first simulation apparatus 1026 has a first interface unit 1046 for receiving a field-oriented stator voltage $u_{s,\phi}$ detected by the first sensor 1042, and a second interface unit 1048 for receiving a field-oriented stator current $i_{s,\phi}$ detected by the second sensor 1044. A simulation unit 1050 of the first simulation apparatus 1026, which is coupled to the first and second interface units 1046, 1048, is designed for simulating the stator voltage $u_{s,st,\phi\#}$ required in the steady state during operation. The field-oriented stator voltage $u_{s,st,\phi\#}$ required in the steady state during operation and generated by the simulation unit 1050 is output to the stator current control apparatus 1034 by means of a third interface unit 1052 of the first simulation apparatus 1026.

At least one of the units 1046-1052 of the first simulation apparatus 1026 and/or at least one apparatus of the first simulation apparatus 1026, the second simulation apparatus 1028 and the third simulation apparatus 1030 are realized by means of hardware and/or software. Furthermore, at least two elements selected from the group consisting of the units 1046-1052 and the apparatuses 1026, 1028, 1030 can be realized integrally or as common code.

For the sake of completeness it is noted that in FIG. 2 a mechanical angular frequency of the rotor in the field-oriented coordinate system is designated by means of Ω and a control rotational speed for the rotational speed control apparatus 1032 is designated by means of $n_*$. Furthermore, vectorial variables are identified by means of an arrow in FIGS. 2 to 4, whereas said variables are identified without an arrow in the description.

Figure 3:
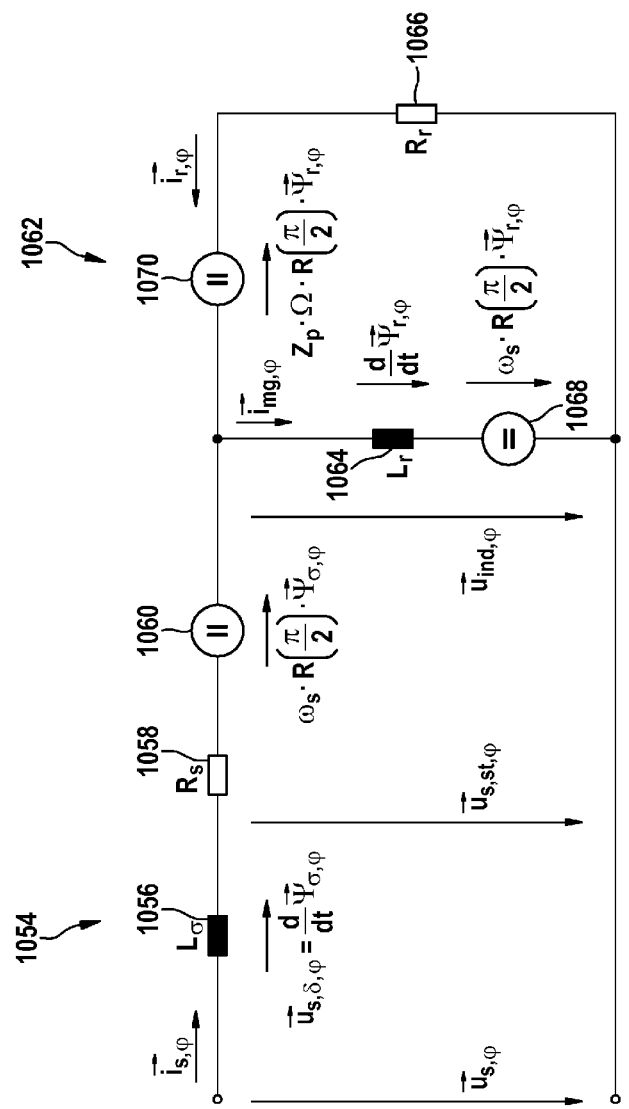
FIG. 3 shows an equivalent circuit diagram of the asynchronous machine in FIG. 1 in a field-oriented coordinate system.

An equivalent circuit diagram of the asynchronous machine 14 as illustrated in FIG. 3 has a stator branch 1054 having a stator or leakage inductance 1056 of the stator having the designation $L_\sigma$, a stator resistance 1058 of the stator having the designation $R_s$ and a unit 1060. The stator branch 54 is coupled to a rotor branch 1062, which has a rotor inductance 1064 of the rotor having the designation $L_r$, a rotor resistance 1066 of the rotor having the designation $R_r$, a first unit 1068 and a second unit 1070. A variable $\omega_s$ denotes a field-oriented stator angular frequency at which the field-oriented coordinate system rotates relative to the stator-oriented coordinate system. The variable $z_P$ denotes a number of pole pairs of the rotor of the asynchronous machine 14. The units 1060, 1068, 1070 can constitute voltage sources.

Figure 4:
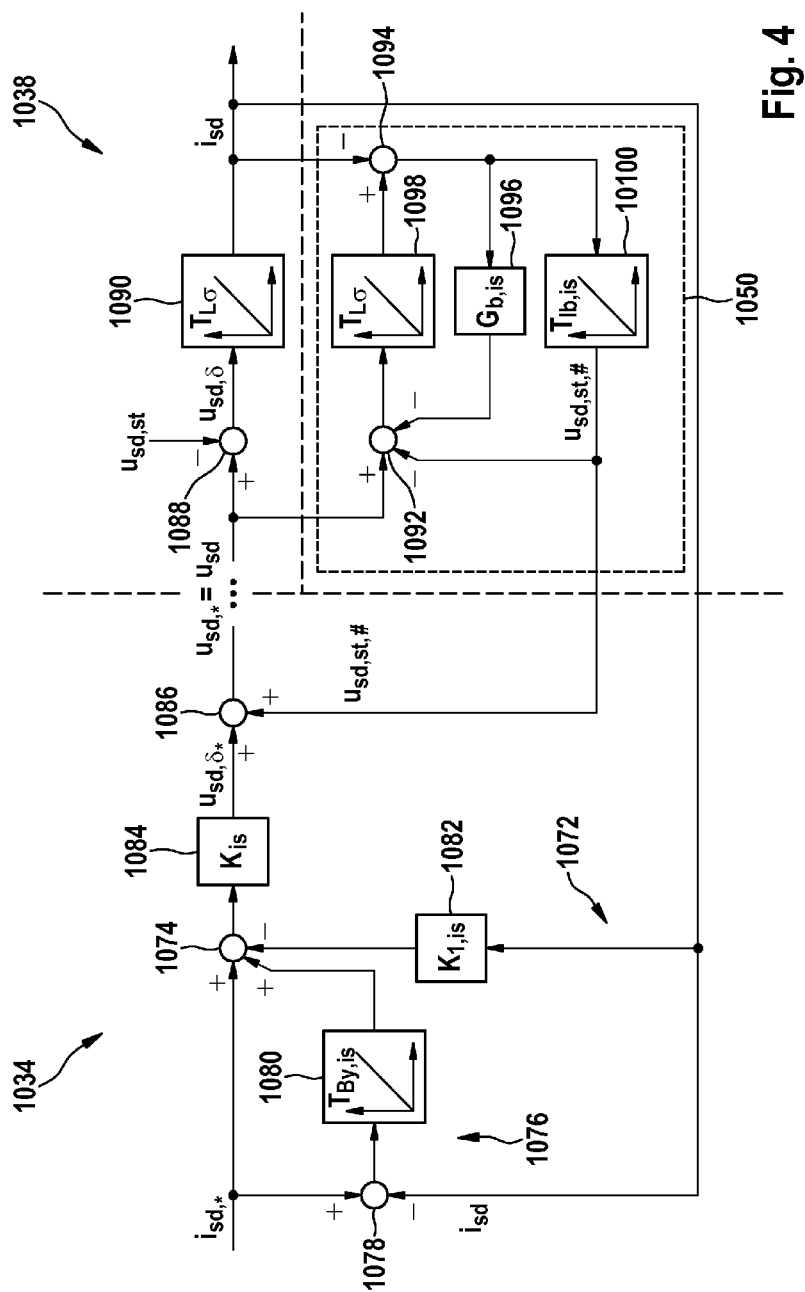
FIG. 4 shows a schematic block diagram of a stator current control apparatus for controlling a field-oriented stator current as illustrated in FIG. 2, a simulation unit of the simulation apparatus illustrated in FIG. 2, and a stator current control section for controlling the field-oriented stator current as illustrated in FIG. 2.

FIG. 4 shows a signal processing of the stator current control apparatus 1034 for the direct-axis component $i_{sd}$ and $u_{sd}$ of the field-oriented stator current $i_{s,\phi}$ and of the field-oriented stator voltage $u_{s,\phi}$, respectively, which is carried out in a similar manner for the quadrature-axis component $i_{sq}$ and $u_{sq}$ of the field-oriented stator current $i_{s,\phi}$ and of the field-oriented stator voltage $u_{s,\phi}$, respectively.

The stator current control apparatus 1034 has a feedback 1072, by means of which the direct-axis component $i_{sd}$ of the field-oriented detected stator current $i_{s,\phi}$ is fed to a combination element 1074. A bypass integrator 1076 of the stator current control apparatus 1034 has a subtraction element 1078 and an integration element 1080 having a normalization constant $T_{By,is}$. By means of the subtraction element 1078, the direct-axis component $i_{sd}$ of the field-oriented detected stator current $i_{s,\phi}$ is subtracted from the direct-axis component $i_{sd,*}$ of the field-oriented setpoint stator current $i_{s,*\phi}$. An output signal of the subtraction element 1078 is integrated by means of the integration element 1080 and is fed to the combination element 1074. The feedback 1072 is additionally provided with an amplifying element 1082, which multiplies the direct-axis component $i_{sd}$ of the field-oriented detected stator current $i_{s,\phi}$ by a section factor $K_{1,is}$. A generated output signal of the amplifying element 1082 is fed to the combination element 1074. The combination element 1074 adds the direct-axis component $i_{sd,*}$ of the field-oriented setpoint stator current $i_{s,*\phi}$ and the output signal of the integration element 1080 and subtracts therefrom the direct-axis component $i_{sd}$ of the field-oriented detected stator current $i_{s,\phi}$ output by the first amplifying element 1082. An output signal of the combination element 1074 is fed to a second amplifying element 1084, which multiplies a section parameter $K_{is}$ by the output signal of the combination element 1074. An output signal of the amplifying element 1084 corresponds to a direct-axis component $u_{sd,\delta*}$ of a field-oriented setpoint stator voltage $u_{s,\delta*}$ dropped across the stator inductance $L_\sigma$ and is fed to an addition element 1086, which adds the direct-axis component $u_{sd,st,\#}$ of the field-oriented stator voltage $u_{s,st,\phi\#}$ required in the steady state during operation as reference variable or as disturbance variable injection to the output signal of the second amplifying element 1084 in order to compensate for a disturbance variable injection of the direct-axis component $u_{sd}$ of the field-oriented detected stator voltage $u_{s,\phi}$ with the field-oriented stator voltage $u_{s,st,\phi}$ required in the steady state during operation in the stator current control section 1038. The output signal of the addition element 1086 corresponds to the direct-axis component $u_{sd,*}$ of the field-oriented setpoint stator voltage $u_{s,*\phi}$ output by the stator current control apparatus 1034.

The stator current control section 1038 illustrated in FIG. 4 for the direct-axis component $u_{sd}$ and $i_{sd}$ of the field-oriented stator voltage $u_{s,\phi}$ and of the field-oriented stator current $i_{s,\phi}$, respectively, is formed by means of a subtraction element 1088, which subtracts a direct-axis component $u_{sd,st}$ of the field-oriented stator voltage $u_{s,st,\phi}$ required in the steady state during operation from the direct-axis component $u_{sd}$ of the field-oriented stator voltage $u_{s,\phi}$. An output signal of the subtraction element 1088 is integrated by means of an integration element 1090, the normalization constant of which is a time constant $T_{L\sigma}$ that is indicative of the leakage inductance 1064 or $L_\sigma$ of the stator and is defined by means of $T_{L\sigma} = L_\sigma * i_B/u_B$. In this case, $i_B$ and $u_B$ denote normalizations for currents and voltages of the control system 1016. An output signal of the integration element 1090 corresponds to the direct-axis component $i_{sd}$ of the controlled field-oriented stator current $i_{s,\phi}$ which is fed to the stator current control apparatus 1034. A functioning of the stator current control section 1038 for the quadrature-axis component $u_{sq}$ and $i_{sq}$ of the field-oriented stator voltage $u_{s,\phi}$ and the field-oriented stator current $i_{s,\phi}$, respectively, takes place in a similar manner to the functioning of the stator current control section 1038 illustrated for the direct-axis component $u_{sd}$ and $i_{sd}$ of the field-oriented stator voltage $u_{s,\phi}$ and of the field-oriented stator current $i_{s,\phi}$, respectively.

The simulation unit 1050, likewise shown in FIG. 4, constitutes an observer for the field-oriented stator voltage $u_{s,\phi}$ and the field-oriented stator current $i_{s,\phi}$ and models the space vector of the stator voltage $u_{s,st,\phi\#}$ required in the steady state during operation by means of a low-pass filter transfer function $$u_{s,st,\phi\#}/u_{s,st,\phi} = 1/(1 + p*T_{b,is} + q_{2b,is}*p^2*(T_{b,is})^2).$$

In this case, it holds true that for a time constant $T_{b,is} = G_{b,is}*T_{Ib,is}$ and for a parameter $q_{2b,is} = T_{L\sigma}/((G_{b,is})^2*T_{Ib,is})$. Taking account of FIG. 3, the field-oriented stator voltage required in the steady state is calculated by means of $$u_{s,st,\phi} = \omega_s * K_{L\sigma} * R(\pi/2) * i_{s,\phi} + K_{Rs} * i_{s,\phi} + u_{ind,\phi}.$$

In this case, the field-oriented induced stator voltage is determined by means of $u_{ind,\phi} = T_{Lr}*d/dt\ i_{mg,\phi} + \omega_s*K_{Lr}*R(\pi/2)*i_{mg,\phi}$. The parameter $K_{L\sigma} = L_{L\sigma}*i_B/(u_B*T_B)$ denotes a section parameter of the asynchronous machine 14 that is indicative of the stator inductance 1056 or $L_\sigma$ or is dependent thereon, and $K_{Rs} = R_s*i_B/u_B$ denotes a section parameter of the asynchronous machine 14 that is indicative of the stator resistance 1058 or $R_s$ and is dependent thereon. The variable $T_{Lr} = L_r*i_B/u_B$ denotes a time constant that is indicative of the rotor inductance 1064 or $L_r$, and $K_{Lr} = T_{Lr}/T_B = (L_r*i_B)/(u_B*T_B)$ denotes a section parameter that is indicative of the rotor inductance 1064 or $L_r$. In this case, $i_B$, $u_B$ and $t_B$ denote the reference variables or normalization variables for currents, voltages and time constants of the control system 1016 and $R(\pi/2)$ denotes a rotation matrix for the value $(\pi/2)$.

For modeling the direct-axis component $u_{sd,st,\#}$ of the simulated field-oriented stator voltage $u_{s,st,\phi\#}$ required in the steady state during operation by means of the relationships presented above, the simulation unit 1050 has a first subtraction element 1092, a second subtraction element 1094, an amplifying element 1096 and a first and second integration element 1098, 10100. The direct-axis component $u_{sd}$ of the field-oriented stator voltage $u_{s,\phi}$ detected by the sensor 1042 is fed to the first subtraction element 1092. An output signal of the subtraction element 1092, which represents a direct-axis component of a field-oriented differential voltage, is integrated over a time using a normalization constant $T_{Lo}$ by means of the first integration element 1098. An output signal of the first integration element 1098 is fed to the second subtraction element 1094, which subtracts the direct-axis component $i_{sd}$ of the stator current $i_{s,\phi}$ detected by the sensor 1044 from the output signal of the first integration element 1098 and generates a direct-axis component of a field-oriented differential current. The output signal of the second subtraction element 1094 is fed to the amplifying element 1096, which multiplies the output signal of the subtraction element 1094 by a gain factor $G_{b,is}$. The generated output signal of the amplifying element 1096 is fed to the first subtraction element 1092. Furthermore, the output signal of the second subtraction element 1094 is fed to the second integration element 10100, which integrates the fed signal over a time using a normalization constant $T_{Ib,is}$ and generates as output signal a direct-axis component $u_{sd,st,\#}$ of the simulated stator voltage $u_{s,st,\phi\#}$ required in the steady state during operation. The output signal of the second integration element 10100 is likewise fed to the first subtraction element 1092. The first subtraction element 1092 subtracts the direct-axis component $u_{sd,st,\#}$ of the simulated field-oriented stator voltage $u_{s,st,\phi\#}$ required in the steady state during operation and the direct-axis component of the amplified field-oriented differential current from the direct-axis component $u_{sd}$ of the field-oriented detected stator voltage $u_{s,\phi}$ and outputs as its output signal the direct-axis component of the field-oriented differential voltage, which is fed to the first integration element 1098. A functioning of the simulation unit 1050 for the quadrature-axis component $u_{sq}$ and $i_{sq}$ of the field-oriented stator voltage $u_{s,\phi}$ and of the field-oriented stator current $i_{s,\phi}$, respectively, takes place in a similar manner to the functioning of the simulation unit 1050 explained for the direct-axis component $u_{sd}$ and $i_{sd}$ of the field-oriented stator voltage $u^{s,\phi}$ and of the field-oriented stator current $i_{s,\phi}$, respectively.

In a settled state of the asynchronous machine 14, the simulation of the field-oriented stator voltage $u_{s,st,\phi\#}$ required in the steady state during operation is exact. The transient response of the simulation apparatus 1026 after a change in the field-oriented stator voltage $u_{s,st,\phi}$ required in the steady state is characterized by the two property parameters $T_{b,is}$ and $q_{2b,is}$ of the low-pass filter transfer function. These property parameters can be defined arbitrarily by the choice of the two adjustment parameters $G_{b,is}$ and $T_{Ib,is}$ of the observer, at least from a theoretical standpoint. In the exemplary embodiment shown, the asynchronous machine 14 is operated in such a way that a time scale of the simulation apparatus 1026 is chosen to be significantly smaller than a time scale of a reference transfer function of the stator current control apparatus 1034, such that the equality of the space vector of the simulated stator voltage $u_{s,st,\phi\#}$ required in the steady state with the space vector of the actual stator voltage $u_{s,st,\phi}$ required in the steady state is also achieved dynamically with very good accuracy. In this case, the time scale of the simulation apparatus 1026 is defined by the time constant $T_{b,is}$, that is to say by $G_{b,is}$ and $T_{Ib,is}$.

The control system 16 in accordance with a second embodiment is described in greater detail below and is designated by the reference sign 2016.

Figure 5:
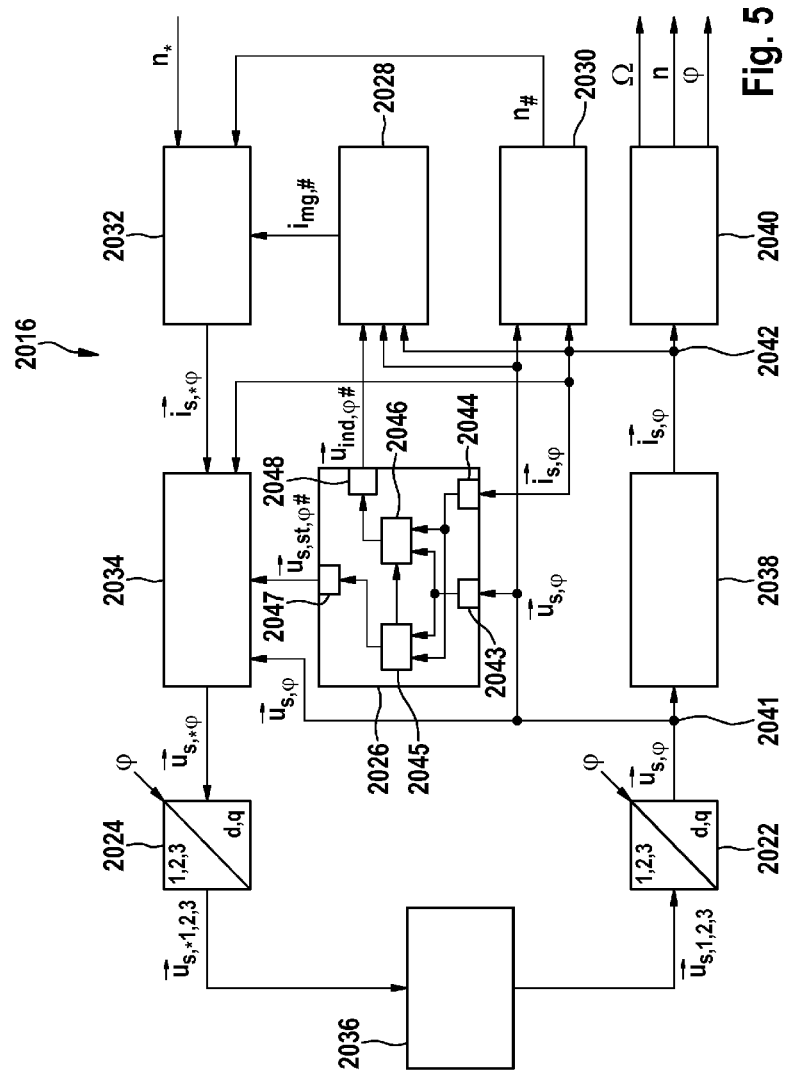
FIG. 5 shows a schematic block illustration of the control system in FIG. 1 in accordance with a second exemplary embodiment.

The control system 2016 illustrated in FIG. 5 comprises a first and second Park transformation unit 2022, 2024 for transforming values of vectorial variables between a stator-oriented coordinate system having the coordinate axes 1, 2, 3 and a field-oriented coordinate system having the coordinate axes d, q using a field angle ϕ, a first simulation apparatus 2026 for simulating a field-oriented stator voltage $u_{ind,\phi\#}$ induced in a stator of the asynchronous machine 14 on account of a rotor flux $\Psi_r$ of the rotor by means of a machine model and a simulated field-oriented stator voltage $u_{s,st,\phi\#}$ required in the steady state during operation of the asynchronous machine 14 by means of the machine model, a second simulation apparatus 2028 for simulating a field-oriented magnetization current $i_{mg,\#}$ of the rotor of the asynchronous machine 14 by means of the machine model, a third simulation apparatus 2030 for simulating a rotational speed $n_\#$ of the rotor of the asynchronous machine 14 by means of the machine model, a rotational speed control apparatus 2032 for controlling the rotational speed n of the rotor of the asynchronous machine 14 by means of a magnetization current control for controlling a magnetization current $i_{mg}$ of the rotor of the asynchronous machine 14, and a stator current control apparatus 2034 for controlling the stator current $i_{s,\phi}$ of the stator of the asynchronous machine 14. The graduated output voltage that can be output by the battery direct inverter 12 is controllable via an actuator 2036 of the control system 2016, which output voltage can be fed in at machine terminals of the asynchronous machine 14. A stator current control section 2038 of the control system 2016, which section serves for controlling a field-oriented stator current $i_{s,\phi}$ and a rotational speed control section 2040 of the control system 2016, which section serves for controlling the magnetization current $i_{mg}$ and the rotational speed n of the rotor of the asynchronous machine 14, model the asynchronous machine 14 by means of the corresponding relationships between respective input variables and output variables of the control sections 2038, 2040. A first sensor 2041 for detecting a field-oriented stator voltage $u^{s,\phi}$ of the stator of the asynchronous machine 14 and a second sensor 2042 for detecting a field-oriented stator current $i_{s,\phi}$ of the stator are in each case coupled to the first, second and third simulation apparatuses 2026, 2028, 2030. The stator current control apparatus 2034 can furthermore be coupled to the first sensor 2041 and the second sensor 2042.

Although the sensors 2041, 2042 are illustrated in terms of circuitry in a manner showing that they are designed for detecting the field-oriented variables, it goes without saying that the sensors detect values in the stator-oriented coordinate system which are converted into corresponding variables in the field-oriented coordinate system or in the simulated field-oriented coordinate system.

A variable identified by an asterisk "*" in FIG. 5 denotes a setpoint variable of a variable to be controlled, Ω denotes a rotational frequency of the rotor in the stator-oriented coordinate system and $n_*$ denotes a control rotational speed for the rotational speed control apparatus 2032. Furthermore, vectorial variables are identified by means of an arrow in FIGS. 5 to 7, whereas said variables are identified without an arrow in the description.

A first interface unit 2043 of the first simulation apparatus 2026 is designed for receiving the field-oriented stator voltage $u_{s,\phi}$ measured by means of the first sensor 2041, and a second interface unit 2044 of the first simulation apparatus 2026 is designed for receiving the field-oriented stator current $i_{s,\phi}$ measured by means of the second sensor 2042. The first and second interface units 2043, 2044 are respectively coupled to the first simulation unit 2045 of the first simulation apparatus 2026, which is designed for simulating a stator voltage $u_{s,st,\phi\#}$ required in the steady state during operation of the asynchronous machine 14 on the basis of the field-oriented stator voltage $u_{s,\phi}$ and the field-oriented stator current $i_{s,\phi}$, and a second simulation unit 2046 of the first simulation apparatus 2026, which is designed for simulating a stator voltage $u_{ind,\phi\#}$ induced in stator windings of the stator on account of the rotor flux $\Psi_r$ of the rotor on the basis of the field-oriented stator voltage $u_{s,\phi\#}$, the field-oriented stator current $i_{s,\phi\#}$ and the stator current $u_{s,st,\phi\#}$ required in the steady state during operation. For this purpose, the first simulation unit 2045 is coupled to the second simulation unit 2046 and additionally to a third interface unit 2047 of the simulation apparatus 2026, which is designed for outputting the simulated field-oriented stator voltage $u_{s,st,\phi\#}$ required in the steady state during operation to the stator current controller 2034. The second simulation unit 2046 is coupled to a fourth interface unit 2048 of the simulation apparatus 2026, which is designed for outputting the simulated field-oriented induced stator voltage $u_{ind,\phi\#}$ to the second simulation apparatus 2028.

At least one unit or apparatus of the units 2043-2048 of the first simulation apparatus 2026, the second simulation apparatus 2028 and the third simulation apparatus 2030 is realized by means of hardware and/or software. Furthermore, at least two elements selected from the group consisting of the units 2043-2048 and the apparatuses 2026, 2028, 2030 can be realized integrally or as common code.

Figure 6:
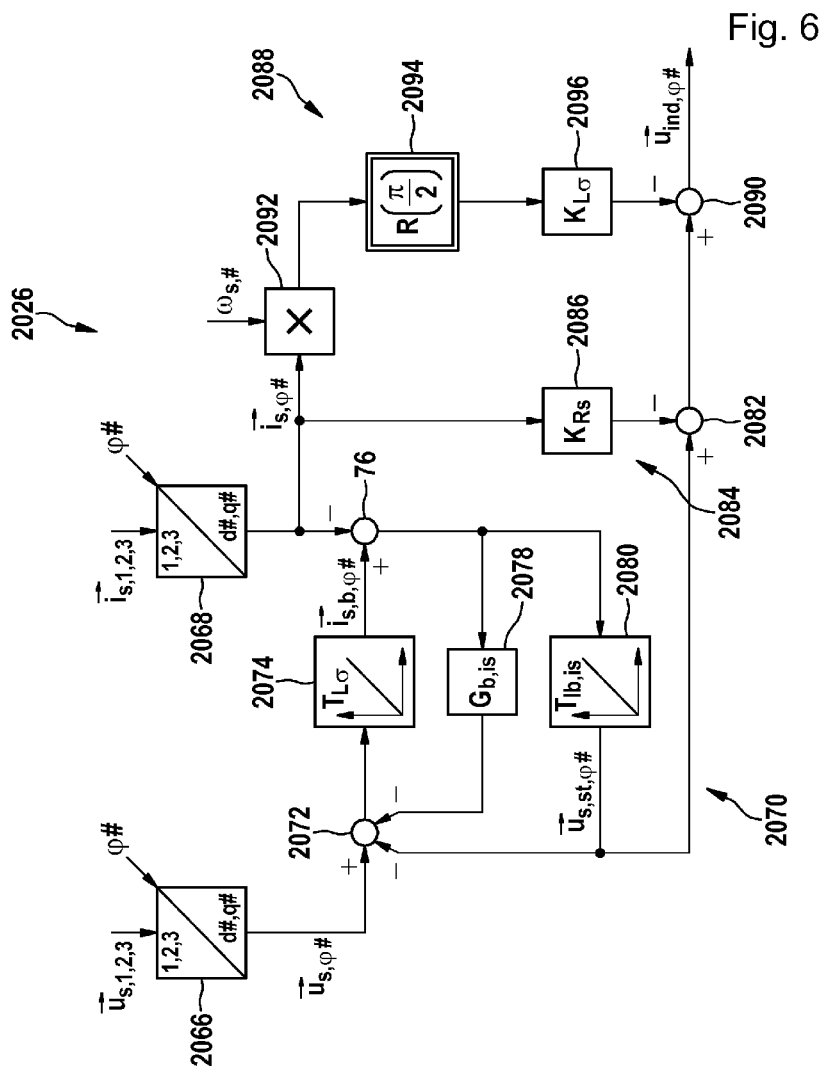
FIG. 6 shows a schematic block illustration of a first simulation apparatus shown in FIG. 5 for simulating a field-oriented stator voltage induced in a stator of the asynchronous machine in FIG. 1 in accordance with one exemplary embodiment.

The block illustration of the first simulation apparatus 2026 as illustrated in FIG. 6 summarizes the functioning of the first and second simulation units 2045, 2046 of the first simulation apparatus 2026. A first and second transformation unit 2066, 2068 of the first simulation apparatus 2026 are designed, taking account of a simulated field angle $\phi_\#$, which is measured between the stator-oriented coordinate system and a simulated field-oriented coordinate system having the axes d#, q#, to convert the stator voltage $u_{s,1,2,3}$ detected by the sensor 2041 and respectively the stator current $i_{s,1,2,3}$ detected by the sensor 2042 into corresponding simulated field-oriented variables $u_{s,\phi\#}$, $i_{s,\phi\#}$.

A first signal processing portion 2070 of the first simulation apparatus 2026 is embodied as a disturbance variable observer and is designed to generate a simulated field-oriented stator voltage $u_{s,st,\phi\#}$ required in the steady state during operation of the asynchronous machine 14 on the basis of the simulated field-oriented stator current $i_{s,\phi\#}$ and the simulated field-oriented stator voltage $u_{s,\phi\#}$. For this purpose, the first signal processing portion 2070 has a first subtraction element 2072, an integration element 2074, a second subtraction element 2076, an amplifying element 2078 and a second integration element 2080. The simulated field-oriented stator voltage $u_{s,\phi\#}$ is converted, by means of the subtraction element 2072 and the integration element 2074 having an integration constant $T_{L\sigma}$, into a simulated field-oriented stator current $i_{s,b,\phi\#}$, from which the simulated field-oriented stator current $i_{s,\phi\#}$ is subtracted by means of the second subtraction element 2076. An output signal of the subtraction element 2076 is fed to the amplifying element 2078, which multiplies a gain factor $G_{b,is}$ by the output signal of the second subtraction element 2076 and outputs a correspondingly multiplied signal to the subtraction element 2072. The output signal of the second subtraction element 2076 is likewise fed to the second integration element 2080, which is characterized by an integration constant $T_{Ib,is}$ and whose output signal is the simulated field-oriented stator voltage $u_{s,st,\phi\#}$ required in the steady state during operation. This stator voltage $u_{s,st,\phi\#}$ is fed to the first subtraction element 2072. The first subtraction element 2072 subtracts the generated simulated field-oriented stator voltage $u_{s,st,\phi\#}$ required in the steady state during operation and the signal output by the amplifying element 2078 from the simulated field-oriented stator voltage $u_{s,\phi\#}$. The simulated field-oriented stator voltage $u_{s,st,\phi\#}$ required in the steady state during operation is likewise fed to a third subtraction element 2082, which subtracts from the last-mentioned variable an output signal of a second signal processing portion 2084 of the first simulation apparatus 2026.

The second signal processing portion 2084 has a second amplifying element 2086, which multiplies the simulated field-oriented stator current $i_{s,\phi\#}$ output by the transformation unit 2086 by a section parameter $K_{Rs}$ of the amplifying element 2086, which is indicative of the stator resistance $R_s$.

An output signal for a third signal processing portion 2088 of the first simulation apparatus 2026 is subtracted from an output signal of the third subtraction element 2082 by means of a fourth subtraction element 2090. The third signal processing portion 2088 has a multiplication element 2092, which multiplies the simulated field-oriented stator current $i_{s,\phi\#}$ output by the second transformation unit 2068 by the simulated stator angular frequency $\omega_s$. A rotation element 2094 generates a rotation of the output signal of the multiplication element 2092 by means of a rotation matrix $R(\pi/2)$ on the value $\pi/2$ and outputs a corresponding output signal to a third amplifying element 2096. The third amplifying element 2096 multiplies the output signal of the rotation element 2094 by a section parameter $K_{L\sigma}$ that is indicative of the stator inductance $L_\sigma$. The output signal of the third amplifying element 2096 is fed to the fourth subtraction element 2090, which subtracts the output signal of the third amplifying element 2096 from the output signal of the third subtraction element 2082 and generates the induced stator voltage $u_{ind,\phi\#}$.

Figure 7:
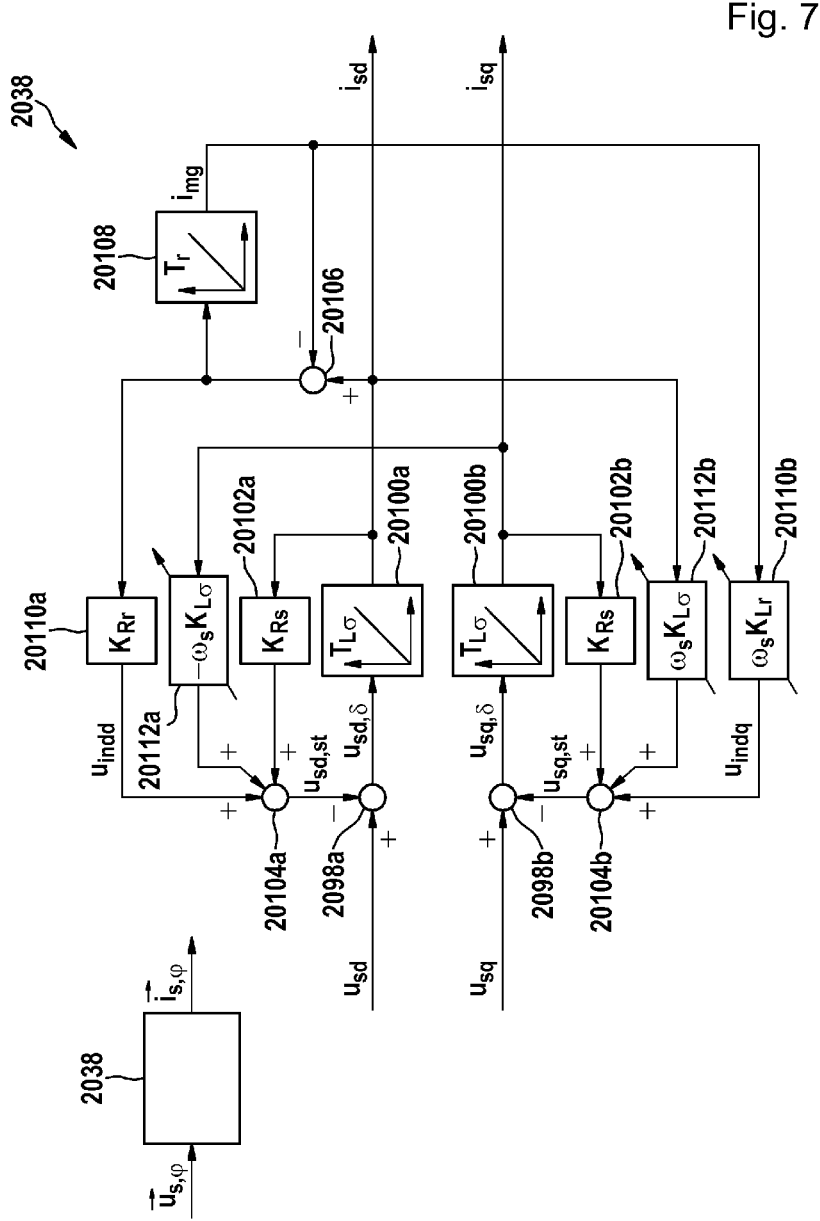
FIG. 7 shows a schematic block illustration of a stator current control section in FIG. 5.

The stator current control section 2038 illustrated in FIG. 7 elucidates a control engineering relationship between the field-oriented stator voltage $u_{s,\phi}$ and the field-oriented stator current $i_{s,\phi}$. A direct-axis component $u_{sd}$ of the field-oriented stator voltage $u^{s,\phi}$ is subjected, by means of a first subtraction element 2098a, to a disturbance in the form of a direct-axis component $u_{sd,st}$ of the stator voltage $u_{s,st,\phi}$ required in the steady state during operation. The output signal $u_{sd,\delta}$ of the first subtraction element 2098a is integrated by means of a first integration element 20100a, which has an integration constant $T_{L\sigma}$ and outputs a direct-axis component $i_{sd}$ of the field-oriented stator current $i_{s,\phi}$. The direct-axis component $i_{sd}$ of the field-oriented stator current $i_{s,\phi}$ is fed to a first amplifying element 20102a, which multiplies a section parameter $K_{Rs}$ that is indicative of the stator resistance $R_s$ by the fed signal. An output signal of the first amplifying element 20102a is fed to an addition element 20104a, the output signal of which is the direct-axis component $u_{sd,st}$ of the field-oriented stator voltage $u_{s,st,\phi}$ required in the steady state during operation. Furthermore, the direct-axis component $i_{sd}$ of the field-oriented stator current $i_{s,\phi}$ is fed to a second subtraction element 20106, which subtracts a magnetization current $i_{mg}$ from the direct-axis component $i_{sd}$ of the field-oriented stator voltage $i_{s,\phi}$. In this case, the magnetization current $i_{mg}$ is generated by means of a second integration element 20108, which integrates the output signal of the second subtraction element 20106 with an integration constant $T_r$. The output signal of the second subtraction element 20106 is also fed to a second amplifying element 20110a, which multiplies a section parameter $K_{Rr}$ that is indicative of the rotor resistance $R_r$ by the input signal and outputs as output signal a direct-axis component $u_{indd}$ of the field-oriented induced voltage $u_{indd}$, which is added to the addition element 20104a. A processing of a quadrature-axis component $u_{sq}$ of the field-oriented stator voltage $u^{s,\phi}$ is carried out in the same way as the above-described signal processing of the direct-axis component $u_{sd}$ of the field-oriented stator voltage $u^{s,\phi}$. In this case, however, the subtraction performed by means of the second subtraction element 20106 and the integration performed by means of the second integration element 20108 are not carried out and the associated components 20106, 20108 are not present.

A nonlinear coupling between the direct-axis component $i_{sd}$ and the quadrature-axis component $i_{sq}$ of the field-oriented stator current $i_{s,\phi}$ is generated by means of a third controllable amplifying element 20112a, which multiplies an input signal, the quadrature-axis component $i_{sq}$ of the field-oriented stator current $i_{s,\phi}$, by a section parameter $-\omega_s K_{L\sigma}$ that is indicative of a product of the stator angular frequency $\omega_s$ and the section parameter $K_{L\sigma}$, and whose output signal is fed to the addition element 20104a. In this case, the section parameter $K_{L\sigma}$ is assigned to a stator inductance $L\sigma$. The direct-axis component $i_{sd}$ of the field-oriented stator current $i_{s,\phi}$ is likewise fed to a third controllable amplifying element 20112b, which multiplies the input signal by a section parameter $\omega_s K_{L\sigma}$ whose sign is interchanged relative to the section parameter of the amplifying element 20112a. The section parameter of the third amplifying element 20112b is indicative of a product of the stator angular frequency $\omega_s$ and the section parameter $K_{L\sigma}$. An output signal of the third amplifying element 20112b is fed to the first subtraction element 20104b.

The method underlying the simulation apparatus 2026 is particularly robust in comparison with a simulation of the field-oriented stator voltage using $$u_{ind,\phi} = u_{s,\phi} - T_{L\sigma}*d/dt(i_{s,\phi}) - \omega_s*K_{L\sigma}*R(\pi/2)*i_{s,\phi} - K_{Rs}*i_{s,\phi}$$

since use of a time derivative of the field-oriented stator current $i_{s,\phi}$ is dispensed with.

The control system 16 in accordance with a third exemplary embodiment is described in greater detail below and is designated by the reference sign 3016.

Figure 8:
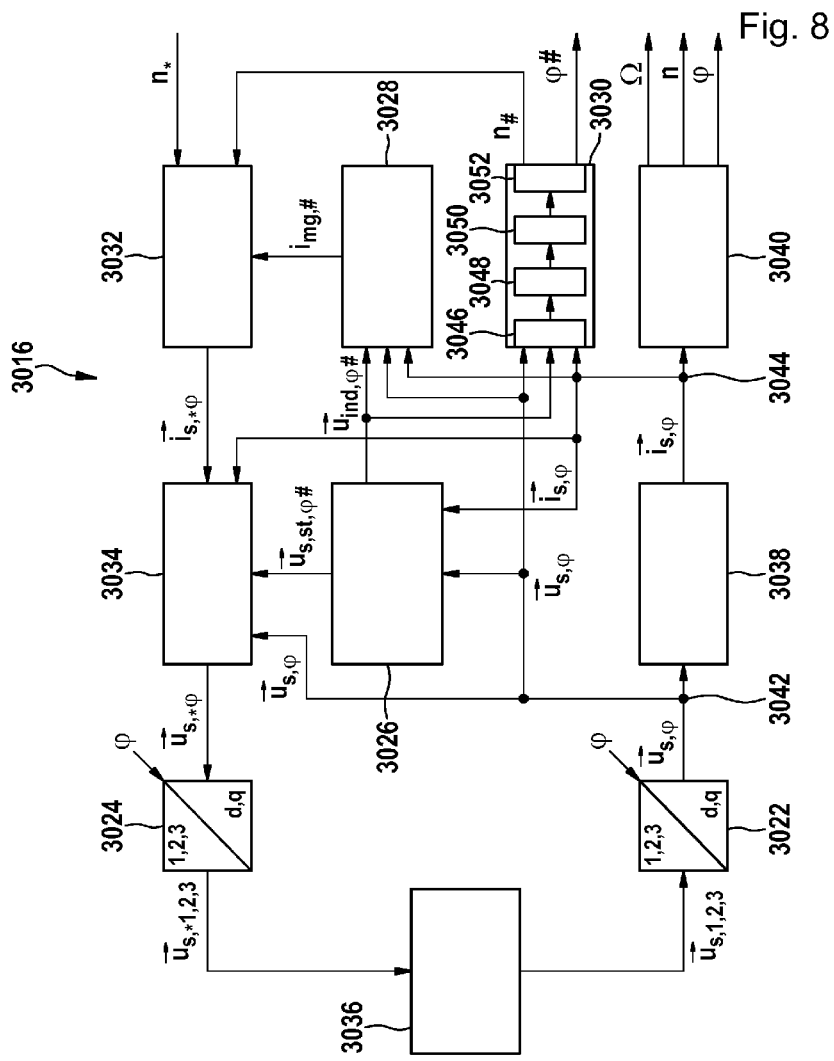
FIG. 8 shows a schematic block illustration of the control system in FIG. 1 in accordance with a third exemplary embodiment.
Figure 9:
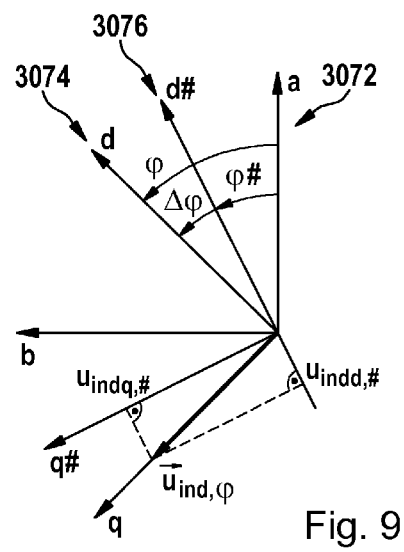
FIG. 9 shows a schematic illustration of a space vector of the stator voltage induced in a stator of the asynchronous machine in FIG. 1 in a stator-oriented coordinate system, in a field-oriented coordinate system and in a simulated field-oriented coordinate system.

The control system 3016 illustrated in FIG. 8 comprises a first and second Park transformation unit 3022, 3024 for transforming three-dimensional values of a variable between a stator-oriented coordinate system having mutually orthogonal coordinate axes 1, 2, 3 and a field-oriented coordinate system having mutually orthogonal coordinate axes d, q using a field angle φ. The control system 16 furthermore comprises a first simulation apparatus 3026 for simulating a field-oriented stator voltage $u_{ind,\phi\#}$ induced in a stator of the asynchronous machine 14 on account of a rotor flux $\Psi_r$ of the rotor by means of a machine model and for simulating a simulated field-oriented stator voltage $u_{s,st,\phi\#}$ required in steady-state operation or in an electrically settled state of the asynchronous machine 14 by means of the machine model, a second simulation apparatus 3028 for simulating a field-oriented magnetization current $i_{mg,\#}$ of the rotor of the asynchronous machine 14 by means of the machine model, and a third simulation apparatus 3030 for simulating a rotational speed n# of the rotor of the asynchronous machine 14 by means of the machine model. The first, second and third simulation apparatuses 3026, 3028, 3030 operate in a simulated or modeled coordinate system defined by means of mutually orthogonal coordinate axes d#, q#.

In addition, the control system 3016 comprises a rotational speed control apparatus 3032 operating in a field-oriented manner and serving for controlling the rotational speed n of the rotor of the asynchronous machine 14 by means of a magnetization current control which is implemented in the rotational speed control apparatus 3032 and operates in a field-oriented manner and serves for controlling a magnetization current $i_{mg}$ of the rotor of the asynchronous machine 14, and a stator current control apparatus 3034 operating in a field-oriented manner and serving for controlling the current $i_{s,\phi}$ of the stator of the asynchronous machine 14 that flows in the stator. The graduated output voltage that can be output by the battery direct inverter 12 is controllable via an actuator 3036 of the control system 3016, which output voltage can be fed in at machine terminals of the asynchronous machine 14. A stator current control section 3038 of the control system 3016, which section serves for controlling a field-oriented stator current $i_{s,\phi}$ and a rotational speed control section 3040 of the control system 3016, which section serves for controlling the magnetization current $i_{mg}$ and the rotational speed n of the rotor of the asynchronous machine 14, model the asynchronous machine 14 by means of the corresponding relationships between respective input variables and output variables of the control sections 3038, 3040. A first sensor 3042 for detecting a field-oriented stator voltage $u_{s,\phi}$ of the stator of the asynchronous machine 14 and a second sensor 3044 for detecting a field-oriented stator current $i_{s,\phi}$ of the stator are in each case coupled to the first, second and third simulation apparatuses 3026, 3028, 3030. The stator current control apparatus 3034 can furthermore be coupled to the first sensor 3042 and the second sensor 3044. Although the sensors 3042, 3044 are illustrated in terms of circuitry in a manner showing that the sensors 3042, 3044 are designed for detecting the field-oriented variables, it goes without saying that the sensors detect values in the stator-oriented coordinate system which are converted into corresponding variables in the field-oriented coordinate system by means of the transformation unit 3022.

The third simulation apparatus 3030 has a first interface 3046 for receiving the simulated induced stator voltage $u_{ind,\phi\#}$, a unit 3048 for determining an angle difference $\Delta\phi$ between the field angle φ# to be simulated and the field angle φ by means of the machine model, a simulation unit 3050 for simulating the field angle φ# on the basis of the determined angle difference $\Delta\phi$ by means of the machine model and an interface 3052 for outputting the simulated field angle φ#.

At least one of the units 3046-3052 of the third simulation apparatus 3030 and/or at least one apparatus of the first simulation apparatus 3026, the second simulation apparatus 3028 and the third simulation apparatus 3030 are realized by means of hardware and/or software. Furthermore, at least two elements selected from the group consisting of the units 3046-3052 and the apparatuses 3026, 3028, 3030 can be realized integrally or as common code.

For the sake of completeness it is noted that in FIG. 8 a mechanical angular frequency of the rotor in the field-oriented coordinate system is designated by means of Ω and a control rotational speed for the rotational speed control apparatus 3032 is designated by means of $n_*$. Furthermore, vectorial variables are identified by means of an arrow in FIGS. 8 to 11, whereas said variables are identified without an arrow in the description.

Taking account of FIG. 8, the third simulation apparatus 30 uses the relationship $u_{ind,\phi}=T_{Lr}*d/dt\ i_{mg,\phi}+\omega_s*K_{Lr}*R(\pi/2)*i_{mg,\phi}=(K_{Rr}*(i_{sd}-i_{mg}),\ \omega_s*K_{Lr}*i_{mg})^t$. In this case, the relationships $T_{Lr}=L_r*i_B/u_B$ and $K_{Lr}=T_L/T_B=(L_r*i_B)/(u_B*T_B)$, wherein $i_B$, $u_B$ and $T_B$ are the reference variables and normalization variables for currents, voltages and time constants of the control system 3016 and $R(\pi/2)$ denotes a rotation matrix for the value $(\pi/2)$ and $(a, b)^t$ denotes a transposed vector. For the direct-axis component $u_{indd}$ of the field-oriented stator voltage $u_{ind,\phi}$ and the quadrature-axis component $u_{indq}$ of the field-oriented stator voltage $u_{ind,\phi}$, it correspondingly holds true that $u_{indd}=T_{Lr}*d/dt\ i_{mg}=K_{Rr}*(i_{sd}-i_{mg})$ and $u_{indq}=\omega_s*K_{Lr}*i_{mg}$ where $K_{Rr}=(R_r*i_B)/u_B$. Suitably (dimension)normalized parameter values of the respective parameters or variables can be used in the equations mentioned above. Alternatively, the normalization variables or the dimensions thereof can be chosen suitably.

Since the rotor resistance $R_r$ and thus the section parameter $K_{Rr}$ have small values in the case of squirrel cage rotor asynchronous machines 12, the direct-axis component $u_{indd}$ of the field-oriented stator voltage $u_{ind,\phi}$ can be assumed with very good approximation to be zero ($u_{indd=0}$) during compensation processes in the control system 3016 for the magnetization current $i_{mg,\phi}$, that is to say if the direct-axis component $i_{sd}$ of the field-oriented stator current $i_{s,\phi}$ is not equal to the field-oriented magnetization current $i_{mg,\phi}$ ($i_{s,\phi} \neq i_{mg,\phi}$). Consequently, in comparison with the stator-oriented coordinate system illustrated in FIG. 9 and provided hereinafter with the reference symbol 3072, said coordinate system being defined by means of a first axis a and a second axis b, in the field-oriented coordinate system 3074 defined by means of a direct axis d and a quadrature axis q, the space vector of the field-oriented induced stator voltage substantially has only a quadrature-axis component $u_{ind,\phi}$ in the direction of the quadrature axis q ($u_{ind,\phi}=(0, u_{indq})^t$). In a simulated or modeled field-oriented coordinate system 3076 defined by means of a simulation direct axis d# and a simulation quadrature axis q#, it holds true that for the space vector of the induced voltages $u_{ind,\phi\#}=(u_{indd,\#}, u_{indq,\#})^t=R(\Delta\phi)*u_{ind,\phi}=u_{ind}*(-\sin(\Delta\phi),\ \cos(\Delta\phi))^t$. Therefore, it holds true that for the direct-axis component $u_{indd,\#}$ of the simulated field-oriented stator voltage $u_{indd,\#}=-\sin(\Delta\phi)*u_{indq}$ and for the quadrature-axis component $u_{indq,\#}$ of the simulated field-oriented stator voltage $u_{indq,\#}=+\cos(\Delta\phi)*u_{indd}$. Therefore, it holds true that $\tan(\Delta\phi)=u_{indd,\#}/u_{indq,\#}$ and, as an approximation for small absolute values of the angle difference $\Delta\phi$, $\tan(\Delta\phi)=-u_{indd,\#}/u_{indq,\#}\approx\Delta\phi$.

Consequently, the absolute value of the simulated field-oriented induced stator voltage $u_{ind,\phi\#}$ corresponds to the absolute value of the field-oriented induced stator voltage $u_{ind,\phi}$, that is to say that $|u_{ind,\phi\#}|=((u_{indd,\#})^2+(u_{indq,\#})^2)^{1/2}=|u_{ind,\phi}|$. Since the induced voltage $u_{ind,\phi}$ substantially only has the quadrature-axis component $u_{indq}$, $|u_{ind,\phi}|=|u_{indq}|=|\omega_s*K_{Lr}*i_{mg}|=|\omega_s|*K_{Lr}*i_{mg}$ holds true with good approximation for the absolute value of the field-oriented induced stator voltage. The simulated field-oriented magnetization current results as $i_{mg,\phi}=((u_{indd,\#})^2+(u_{indq,\#})^2)^{1/2}/(|\omega_s|*K_{Lr})$.

Assuming that a high-quality signal is present for the modeling of the stator angular frequency $\omega_s$ and the modeling is particularly exact, the simulation unit 5048 can calculate the simulated field-oriented magnetization current $i_{mg,\#}$ using $i_{mg,\#}=((u_{indd,\#})^2+(u_{indq,\#})^2)^{1/2}/(|\omega_{s,\#}|*K_{Lr,\#})$.

The third simulation unit 5050 calculates the simulated rotor flux linkage $\Psi_{r,\#}$ with very good approximation as $\Psi_{r,\#}=K_{Lr,\#}*i_{mg,\#}=\Psi_r=K_{Lr}*i_{mg}$.

Figure 10:
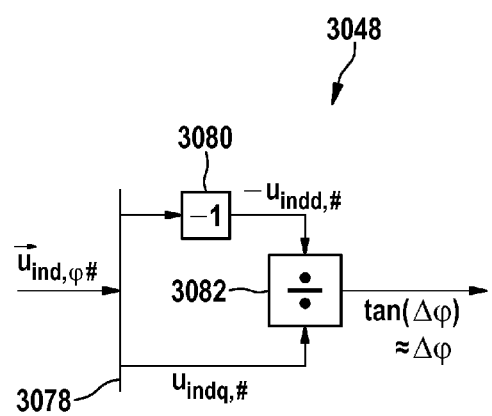
FIG. 10 shows a schematic block diagram of a unit for determining an angle difference between a simulated field angle and a field angle as illustrated in FIG. 8.

The unit 3048 illustrated in greater detail in FIG. 10 has a coordinate decomposition element 3078, which outputs a direct-axis component $u_{indd,\#}$ of the simulated induced stator voltage $u_{ind,\phi\#}$ and a quadrature-axis component $u_{indq,\#}$ of the simulated induced stator voltage $u_{ind,\phi\#}$. An amplifying element 3080 multiplies the fed direct-axis component $u_{indd,\#}$ of the simulated induced stator voltage $u_{ind,\phi\#}$ by a factor −1 and outputs the negative direct-axis component $-u_{indd,\#}$ of the simulated induced stator voltage $u_{ind,\phi\#}$. The output signal of the amplifying element 3080 and the quadrature-axis component $u_{indq,\#}$ of the simulated induced stator voltage $u_{ind,\phi\#}$ output by the coordinate splitting element 3078 are fed to a division element 3082, which calculates a ratio between both input signals as $\tan(\Delta\phi)=-u_{indd,\#}/u_{indq,\#}$. Assuming that the angle difference $\Delta\phi$ has small absolute values, an output signal of the division element 3082 corresponds to the angle difference $\Delta\phi=\phi\#-\phi$ between the simulated field angle $\phi\#$ and the field angle $\phi$ since $\tan(\Delta\phi)\approx\Delta\phi$ holds true.

Figure 11:
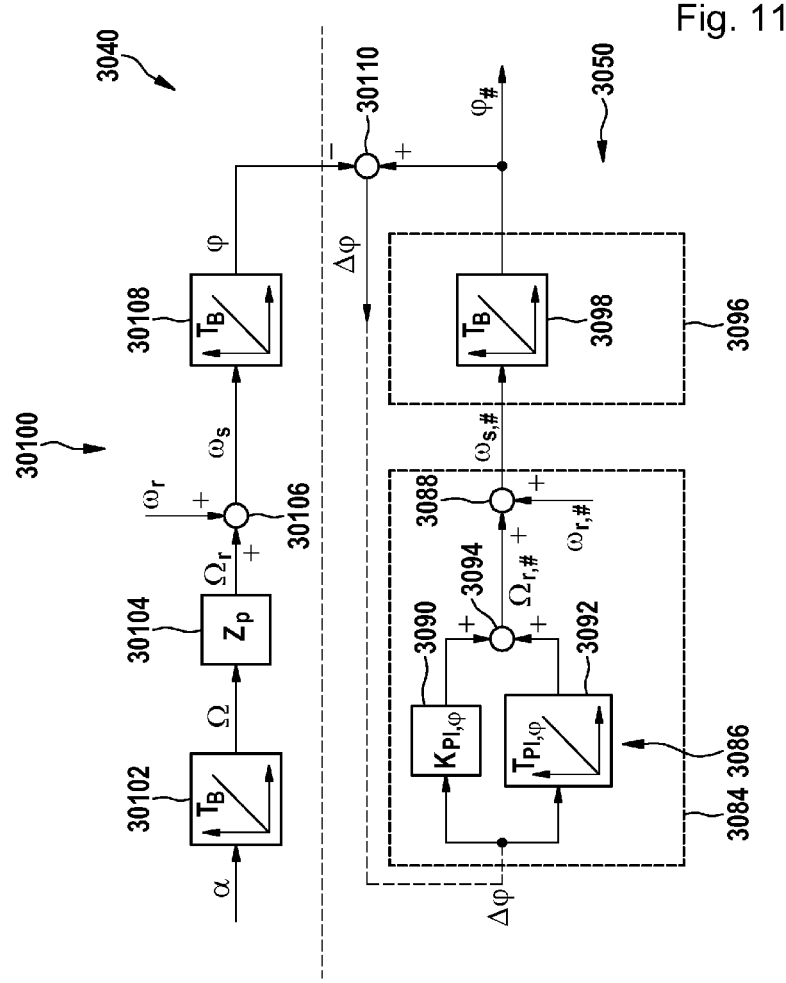
FIG. 11 shows a schematic block diagram of a simulation unit for simulating the field angle as illustrated in FIG. 8 and an excerpt from a rotational speed control section illustrated in FIG. 9.

The simulation unit 3050 shown in greater detail in FIG. 11 receives the angle difference $\Delta\phi$ determined by the unit 3048 and feeds it to a control unit 3084 formed by means of a PI controller 3086 and a first addition element 3088. The PI controller 3086 has an amplifying element 3090, which multiplies the angle difference $\Delta\phi$ by a gain factor $K_{PI,\phi}$, a first integration element 3092, which integrates the angle difference $\Delta\phi$ over a time using an integration constant $T_{PI,\phi}$, and a second addition element 3094, which adds the output signals of the amplifying element 3090 and of the integration element 3092. The output signal of the second addition element 3094 is a simulated electrical rotor angular frequency $\Omega_{r,\#}$ and is fed to the first addition element 3088, which adds the fed output signal and a simulated slip angular frequency $\omega_{r,\#}$, and outputs the simulated stator angular frequency $\omega_{s,\#}$. The simulated slip angular frequency $\omega_{r,\#}$ is assigned to a slip between a rotor flux $\Psi_{r,\#}$ and a stator flux $\Psi_{s,\#}$. A unit 3096 connected downstream of the controller 3084 and embodied as a digital integrator has a second integration element 3098, which integrates the simulated stator angular frequency $\omega_{s,\#}$ over a time using an integration constant $T_B$ in accordance with the relationship $\phi\#=(1/T_B)*\int \omega_{s,\#}\ dt$. An output signal of the second integration element 3098 corresponds to the simulated field angle $\phi\#$.

The field angle control section 30100, likewise shown in FIG. 11, forms a portion of the rotational speed control section 3040 in FIG. 8. A differentiating element 30102 of the field angle control section 30100 receives an angle $\alpha$ of the rotor with respect to the stator-oriented coordinate system and differentiates the angle $\alpha$ and outputs the mechanical rotor angular velocity or rotor angular frequency $\Omega$ of the rotor to an amplifying element 30104. In this case, $T_B$ can correspond to an integration constant that can be assigned to the differentiating element 30102. As an alternative to the differentiating element 30102, an angular acceleration can be integrated over time by means of an integrating element that uses the integration constant $T_B$, and the rotor angular frequency $\Omega$ can be output. The amplifying element 30104 amplifies the fed rotor angular frequency $\Omega$ with a gain factor $z_P$, corresponding to the pole pair number of the rotor, and outputs an electrical rotor angular velocity or rotor angular frequency $\Omega_r$ of the rotor. The output electrical rotor angular frequency $\Omega_r$ is added, by means of an addition element 30106, to the slip angular frequency $\omega_r$ assigned to a slip of the rotor field relative to the stator field, and outputs the stator angular frequency $\omega_s$ as the result. The output stator angular frequency $\omega_s$ is fed to an integration element 30108, which integrates the received stator angular frequency $\omega_s$ using the integration constant $T_B$ over a time and outputs the field angle $\phi$.

A subtraction element 30110 of the simulation unit 3050 calculates a difference between the field angle $\phi\#$ simulated by means of the control unit 3084 and the unit 3096 and the field angle $\phi$ output by the field angle control section 30100 and outputs the angle difference $\Delta\phi$, which is fed to the control unit 3084. The subtraction element 30110 represents an optional component and is intended to illustrate that the simulation of the field angle $\phi\#$ of the asynchronous machine 14 can be understood as a control loop which is indicated by means of the dashed lines in FIG. 11 and by means of which the simulated field angle $\phi\#$ can be tracked to the actual field angle $\phi$. In this control loop, the angle difference $\Delta\phi$ output by the subtraction element 30110 replaces the angle difference $\Delta\phi$ output by the unit 3048.

For the simulation or modeling of the field angle $\phi\#$, in the case of a simulated rotor angular frequency $\omega_{r\#}$ of zero or if no addition is carried out by means of the first addition element 3088, a transfer function results as $$(\phi\#/\phi)|_{\omega_{r\#}=0}=(1+p*T_\phi)/(1+p*T_\phi+q_{2,\phi}*p^2*(T_\phi)^2).$$

In this case, the relationships $T_\phi=K_{PI,\phi}*T_{PI,\phi}$ and $q_{2,\phi}=(1/K_{PI,\phi})^2*(T_B/T_{PI,\phi})$ hold true. In the case of this transfer function, the angle difference $\Delta\phi$, that is to say the phase displacement angle between the field-oriented coordinate system 3074 and the simulated field-oriented coordinate system 3076 which is taken as a basis for the calculations of the first simulation apparatus 3026, the second simulation apparatus 3028 and the third simulation apparatus 3030 during the simulation of the respective variables, in the event of a rapid change in the slip angular frequency $\omega_r$, would temporarily have relatively large deviations until a steady state is established. In order to prevent these deviations, the simulated slip angular frequency $\omega_{r\#}$ is impressed on the output signal of the PI controller 3086 in a similar manner to feedforward control. A dynamically high-quality simulation of the stator angular frequency $\omega_{s\#}$ and the field angle $\phi\#$ is realized as a result.

The control system 16 in accordance with a fourth exemplary embodiment is described in greater detail below and is designated by the reference sign 4016.

Figure 12:
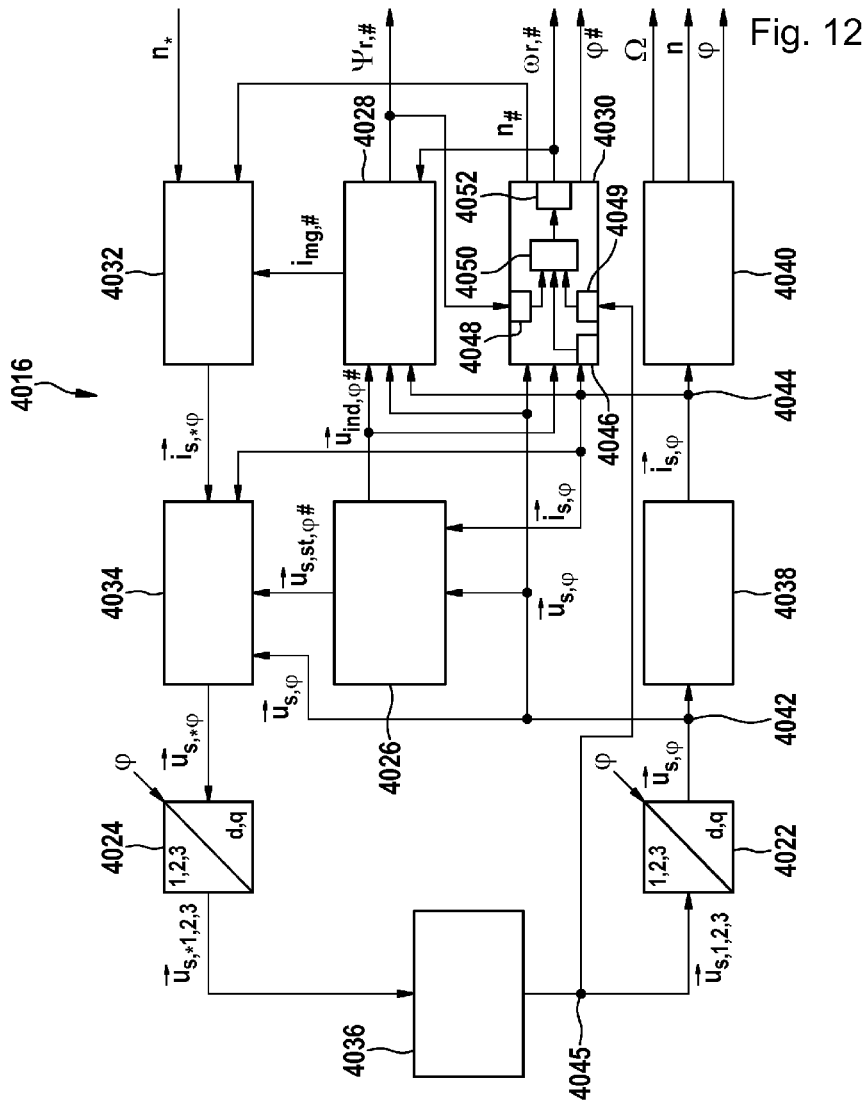
FIG. 12 shows a schematic block illustration of the control system in FIG. 1 in accordance with a fourth exemplary embodiment.

The control system 4016 illustrated in FIG. 12 comprises a first and second Park transformation unit 4022, 4024 for transforming three-dimensional values of a variable or of a parameter between a stator-oriented coordinate system, which is defined by means of mutually orthogonal coordinate axes 1, 2, 3, and a field-oriented coordinate system, which is defined by means of mutually orthogonal coordinate axes d, q, using a field angle $\phi$.

The control system 4016 furthermore comprises a first simulation apparatus 4026 for simulating a field-oriented stator voltage $u_{ind,\phi\#}$ induced in a stator of the asynchronous machine 14 on account of a rotor flux $\Psi_r$ of the rotor by means of a machine model and for simulating a simulated field-oriented stator voltage $u_{s,st,\phi\#}$ required in the steady state during operation of the asynchronous machine 14 by means of the machine model. A second simulation apparatus 4028 of the control system 4016 is designed for simulating a field-oriented magnetization current $i_{mg,\#}$ of the rotor of the asynchronous machine 14 by means of the machine model and for simulating a field-oriented rotor flux linkage $\Psi_{r,\#}$ by means of the machine model. For the sake of simplicity, the rotor flux and the rotor flux linkage are designated by means of the shared Greek letter $\Psi_r$. A third simulation apparatus 4030 is designed for simulating a rotational speed n# of the rotor of the asynchronous machine 14 by means of the machine model, for simulating a slip angular frequency $\omega_{r,\#}$ by means of the machine model and for simulating a field angle $\phi\#$ by means of the machine model. The first, second and third simulation apparatuses 4026, 4028, 4030 operate in a simulated or modeled coordinate system defined by means of mutually orthogonal coordinate axes d#, q# and the field angle $\phi\#$.

Furthermore, the control system 4016 comprises a rotational speed control apparatus 4032 operating in a field-oriented manner and serving for controlling the rotational speed n of the rotor of the asynchronous machine 14 by means of a magnetization current control that is implemented in the rotational speed control apparatus 4032 and operates in a field-oriented manner and serves for controlling a magnetization current $i_{mg}$ of the rotor of the asynchronous machine 14, and a stator current control apparatus 4034 operating in a field-oriented manner and serving for controlling the stator current $i_{s,\phi}$ of the stator of the asynchronous machine 14 that flows in the stator. Via an actuator 4036 of the control system 4016, the output voltage that can be output by the voltage source 12 and is adjustable in a stepped manner is controllable, which output voltage can be fed in at machine terminals of the asynchronous machine 14. A stator current control section 4038 of the control system 4016, which section serves for controlling a field-oriented stator current $i_{s,\phi}$, and a rotational speed control section 4040 of the control system 4016, which section serves for controlling the magnetization current $i_{mg}$ and the rotational speed n of the rotor of the asynchronous machine 14, model the asynchronous machine 14 by means of the corresponding relationships between respective input variables $u^{s,\Phi}$ and $i_{s,\phi}$ and output variables $i_{s,\phi}$ and $\Omega$, n, $\phi$ of the control sections 4038, 4040. In this case, $\Omega$ denotes a mechanical angular frequency of the rotor in the field-oriented coordinate system.

A first sensor 4042 for detecting a field-oriented stator voltage $u_{s,\phi}$ of the stator of the asynchronous machine 14 and a second sensor 4044 for detecting a field-oriented stator current $i_{s,\phi}$ of the stator are in each case coupled to the first, second and third simulation apparatuses 4026, 4028, 4030. The stator current control apparatus 4034 can furthermore be coupled to the first sensor 4042 and the second sensor 4044. A third sensor 4045 is designed for detecting a stator temperature of the stator of the asynchronous machine 14 and is coupled to the third simulation apparatus 4030.

Although the sensors 4042, 4044 are illustrated in terms of circuitry in a manner showing that the sensors 4042, 4044 are designed for detecting the field-oriented variables, it goes without saying that the sensors detect values in the stator-oriented coordinate system which are converted into corresponding variables in the field-oriented coordinate system by means of the transformation unit 4022.

The third simulation apparatus 4030 has a first interface unit 4046 for receiving a field-oriented stator current detected by the second sensor 4044, and a second interface unit 4048 for receiving the simulated field-oriented rotor flux linkage $\omega_{r,\#}$ generated by the second simulation apparatus 4028. A third interface unit 4049 of the third simulation apparatus 4030 is designed for receiving the stator temperature fed by the third sensor 4045. A simulation unit 4050 of the third simulation apparatus 4030 is designed to simulate the field-oriented slip angular frequency $\omega_{r,\#}$ on the basis of the field-oriented stator current $i_{s,\phi}$ fed by the first interface unit 4046, the simulated field-oriented rotor flux linkage $\Psi_{r,\#}$ fed by the second interface unit 4048 and the stator temperature provided by the third interface unit 4048 by means of the machine model. An output value of the simulation unit 4050 corresponds to the simulated slip angular frequency $\omega_{r,\#}$ and can be output by means of a fourth interface unit 4052.

At least one of the units 4046-4052 of the third simulation apparatus 4030 and/or at least one apparatus of the first simulation apparatus 4026, the second simulation apparatus 4028 and the third simulation apparatus 4030 are realized by means of hardware and/or software. Furthermore, at least two elements selected from the group consisting of the units 4046-4052 and the apparatuses 4026, 4028, 4030 can be realized integrally or as common code.

For the sake of completeness, it is noted that a control rotational speed for the rotational speed control apparatus 4032 is designated by means of $n_*$ in FIG. 12. Variables in FIG. 12 that are identified by an asterisk denote setpoint variables in the control system 4016. Furthermore, vectorial variables are identified by means of an arrow in FIGS. 3 and 12, whereas said variables are identified without an arrow in the description.

Referring to FIG. 1, the arrangement 10 can alternatively or additionally be embodied as follows: the arrangement 10 shown in FIG. 1 comprises an asynchronous machine 14 of squirrel cage rotor design, a control system 16 for the field-oriented control of the asynchronous machine 14 without a rotary encoder, and a voltage source 12 embodied as a battery direct inverter that outputs a graduated three-phase voltage, which is provided with three voltage branches 17a, 17b, 17c. The arrangement 10 is part of an electric drive that can be used in static installations, such as, for example, in a wind turbine, or in a vehicle, for example in a hybrid or electric vehicle. The arrangement 10 can also be part of a transaction drive.

The voltage source 12 embodied with the three voltage branches 17a, 17b, 17c is designed to feed graduated output voltages to the asynchronous machine 14 via a respective positive pole U, V, W. Each voltage branch 17a, 17b, 17c is provided with a multiplicity of battery modules with coupling devices, which are designated only in the voltage branch 17c with the reference signs 18a and 18b, respectively, for the sake of clarity. Optional disconnecting devices 20a and optional charging and disconnecting devices 20b of the voltage branches 17a, 17b, 17c are respectively coupled to a battery module 18a and 18b of the voltage branches 17a, 17b, 17c. Negative poles of the battery direct inverter 16 are connected to form a star point, but can also be electrically isolated from one another. Although the voltage source 12 is embodied as rechargeable and constitutes a rechargeable battery or a rechargeable battery system, the voltage source 12 is referred to as a battery or as a battery system in accordance with customary linguistic usage.

Figure 13:
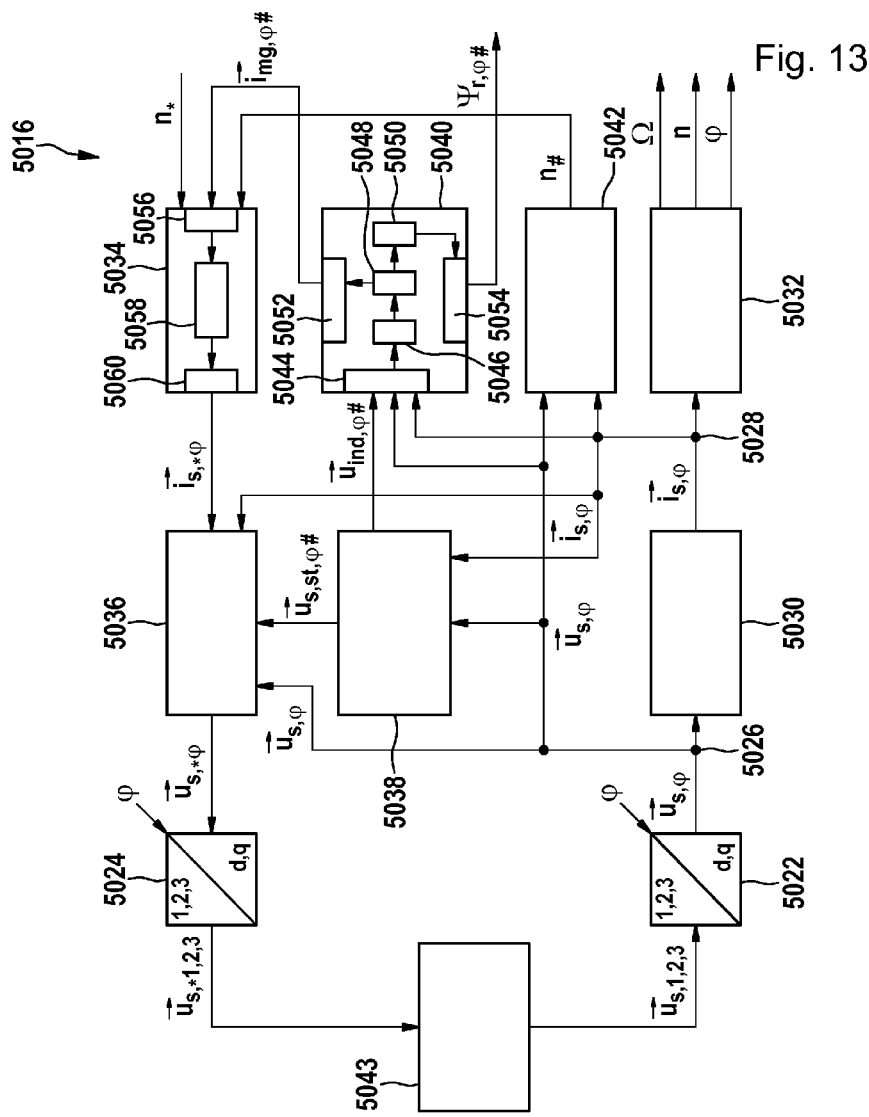
FIG. 13 shows a schematic block illustration of the control system in FIG. 1 in accordance with a fifth exemplary embodiment.

The last-described control system 16 in accordance with a fifth exemplary embodiment in FIG. 13 is described in greater detail below and is designated by the reference sign 5016. This exemplary embodiment of the control system 5016 can be used in the arrangement 10 described first with reference to FIG. 1 instead of the control system 1016, 2016, 3016, 4016 or 6016. The control systems 1016, 2016, 3016, 4016 and respectively 6016 can also be used in the arrangement 10 just described.

The control system 5016 comprises a first and second Park transformation unit 5022, 5024 for transforming values of vectorial variables between a stator-oriented coordinate system and a field-oriented coordinate system, first and second sensors 5026, 5028 for detecting a field-oriented stator voltage $u_{s,\varphi}$ and a field-oriented stator current $i_{s,\varphi}$, respectively, a stator current control section 5030 for controlling the field-oriented stator current $i_{s,\varphi}$, a rotational speed control section 5032 for controlling a magnetization current $i_{mg}$ and a rotational speed n of a rotor of the asynchronous machine 14, a rotational speed controller or control apparatus 5034 for the field-oriented control of the magnetization current $i_{mg}$ and the rotational speed n of the rotor of the asynchronous machine 14 and a stator current controller or control apparatus 5036 for the field-oriented control of the stator current $i_{s,\varphi}$. The stator current control apparatus 5036 can be coupled to the first sensor 5026 and second sensor 5028. The stator current control section 5030 and the rotational speed control section 5032 model the asynchronous machine 14 by means of the corresponding relationships between respective input variables and output variables of the control sections 5030, 5032. In particular, the rotational speed control section 5032, as is described later in detail with reference to figure FIG. 14, can output the rotational speed n and the field angle ϕ. Although the sensors 5026, 5028 are illustrated in terms of circuitry in a manner showing that they are designed for detecting the field-oriented variables, it goes without saying that the sensors detect values in the stator-oriented coordinate system which are converted into corresponding variables in the field-oriented coordinate system or in the simulated field-oriented coordinate system.

A first simulation apparatus 5038 of the control system 5016 is designed for simulating a field-oriented stator voltage $u_{s,st,\varphi\#}$ required in the steady state during the operation of the asynchronous machine 14 and a field-oriented stator voltage $u_{ind,\varphi\#}$ induced in the stator on the basis of the field-oriented stator voltage $u^{s,\varphi}$ measured by the first sensor 5026 and correspondingly transformed and the field-oriented stator current $i_{s,\varphi}$ measured by the second sensor 5028 and correspondingly transformed, using a machine model which models the asynchronous machine 14. A second simulation apparatus 5040 of the control system 5016 is designed to simulate a stator angular frequency $\omega_{s,\#}$, a field-oriented magnetization current $i_{mg,\varphi\#}$ and a field-oriented rotor flux linkage $\Psi_{r,\varphi\#}$ by means of the machine model. A third simulation apparatus 5042 of the control system 5014 is designed for simulating a rotational speed $n_\#$ of the rotor of the asynchronous machine 14 on the basis of the field-oriented stator voltage $u^{s,\varphi}$ measured by the first sensor 5026 and transformed and the field-oriented stator current $i_{s,\varphi}$ measured by the second sensor 5028 and transformed, using the machine model. Via an actuator 5043 of the control system 5016, the graduated output voltage that can be output by the battery direct inverter 12 is controllable, which voltage can be fed in at machine terminals of the asynchronous machine 14.

The second simulation apparatus 5040 has a first interface unit 5044 for receiving the field-oriented stator voltage $u^{s,\varphi}$ measured by the first sensor 5026 and transformed, the field-oriented stator current $i_{s,\varphi}$ measured by the second sensor 5028 and transformed, and the field-oriented induced stator voltage $u_{ind,\varphi\#}$ simulated by means of the first simulation apparatus 5038. A first simulation unit 5046 of the second simulation apparatus 5040 is communicatively coupled to the first interface unit 5044 and designed for simulating the stator angular frequency $\omega_{s,\#}$ on the basis of the simulated field-oriented induced stator voltage $u_{ind,\varphi\#}$. A second simulation unit 5048 of the second simulation apparatus 5040 is communicatively coupled to the first interface unit 5044 and the first simulation unit 5046 and is designed for simulating the field-oriented magnetization current $i_{mg,\varphi\#}$ on the basis of the simulated field-oriented induced stator voltage $u_{ind,\varphi\#}$ and the simulated stator angular frequency $\omega_{s,\#}$. A third simulation unit 5050 of the second simulation apparatus 5040 is communicatively coupled to the second simulation unit 5048 and is designed for simulating the field-oriented rotor flux linkage $\omega_{r,\phi\#}$ on the basis of the simulated field-oriented magnetization current $i_{mg,\phi\#}$. A second interface unit 5052 of the second simulation apparatus 5040 is designed for outputting the field-oriented magnetization current $i_{mg,\phi\#}$ simulated by means of the second simulation unit 5048 to the rotational speed controller 5034. A third interface unit 5054 of the second simulation apparatus 5040 is designed for outputting the field-oriented rotor flux linkage $\Psi_{r,\phi\#}$ simulated by means of the third simulation unit 5050.

The rotational speed controller 5034 has a first interface unit 5056 for receiving the simulated field-oriented magnetization current $i_{mg,\phi\#}$, the simulated rotational speed $n_\#$ output by the third simulation apparatus 5042 and a rotational speed control value n* and is communicatively coupled to a magnetization current controller 5058 accommodated in the rotational speed controller 5034 and serving for the field-oriented control of the magnetization current $i_{mg,\phi}$ of the rotor on the basis of the simulated field-oriented magnetization current $i_{mg,\phi\#}$. The magnetization current controller or control unit 5058 is designed to output a direct-axis component $i_{sd}$ of a field-oriented setpoint stator current $i_{s,*\phi}$ to the stator current controller 5036, which can be fed together with a quadrature-axis component $i_{sq}$ as setpoint stator current $i_{s,*\phi}$ via a second interface unit 5060 of the rotational speed controller 5034 to the stator current controller 5036. This results in a control loop for the field-oriented magnetization current $i_{mg,\phi}$ and the field-oriented rotor flux $\Psi_{r,\phi}$ of the asynchronous machine 14. A setpoint stator voltage $u_{s,*\phi}$ output by the stator current controller 5036 can be fed as setpoint stator voltage $u_{s,*1,2,3}$ to the actuator 5043 of the control system 14 for the asynchronous machine 14.

At least one of the first, second and third simulation apparatuses 5036, 5038, 5040 is realized by means of hardware and/or software. At least two apparatuses of the first, second and third simulation apparatuses 5038, 5040, 5042 can be realized integrally or as common code.

Figure 14:
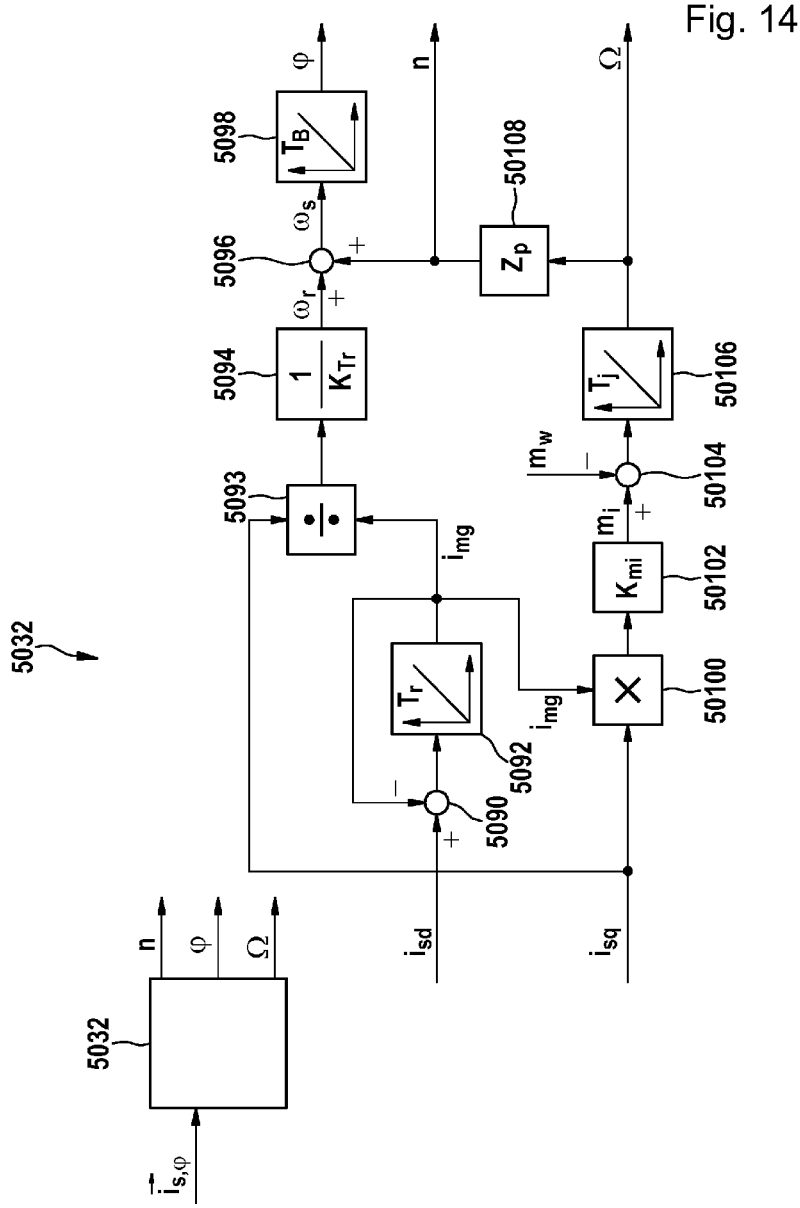
FIG. 14 shows a schematic block diagram of a field-oriented magnetization current control section of the control system in FIG. 13.

It is noted that vectorial variables are identified by means of an arrow in FIGS. 13 and 14, whereas said variables are identified without an arrow in the description.

The rotational speed control section 5032 shown in FIG. 14 has for the direct-axis component $i_{sd}$ of the space vector of the field-oriented stator current $i_{s,\phi}$ a subtraction element 5090, which subtracts the magnetization current $i_{mg}$ from the direct-axis component $i_{sd}$, and a first-order integrating element 5092 having a delay time constant formed by the rotor time constant $T_r$, said integrating element outputting the magnetization current $i_{mg}$. The magnetization current $i_{mg}$ is fed to a dividing element 5093, which forms, as nonlinear coupling of the two components $i_{sd}$, $i_{sq}$ of the stator current $i_{s,\phi}$, a quotient between the quadrature-axis component $i_{sq}$ of the space vector of the field-oriented stator current $i_{s,\phi}$ and the magnetization current $i_{mg}$. An output value of the dividing element 5093 is fed to an amplifying element 5094, which multiplies a proportionality factor $1/K_{Tr}$ by the output signal and outputs the slip angular frequency $\omega_r$ as output value. An adding element 5096 adds the slip angular frequency $\omega_r$ to a rotational speed n and outputs the stator angular frequency $\omega_s$, which is integrated by means of an integrating element 5098 with a reference time constant $T_B$, such that the field angle $\phi$ is generated. The quadrature-axis component $i_{sq}$ of the space vector of the field-oriented stator current $i_{s,\phi}$ is fed to a multiplication element 50100 besides the dividing element 5093, which multiplication element, as nonlinear coupling of the two components $i_{sd}$, $i_{sq}$ of the stator current $i_{s,\phi}$ multiplies the magnetization current $i_{mg}$ output by the integrating element 5092 by the quadrature-axis component $i_{sq}$. The output value of the multiplication element 50100 is fed to an amplifying element 50102, which multiplies a proportionality factor $K_{mi}$, by the output signal and outputs a torque $m_i$ to a subtraction element 50104, which subtracts a torque or resistance moment $m_w$ from the torque $m_i$. The output value of the subtraction element 50104 is fed to an integrating element 50106 having a time constant $T_j$ that represents the moment of inertia of the asynchronous machine 14, the output signal of which integrating element is the rotational frequency $\Omega$ of the rotor in the stator-oriented coordinate system 3082. The rotational frequency $\Omega$ is fed to an amplifying element 50108 which multiplies the rotational frequency $\Omega$ by a proportionality constant $Z_p$, a pole pair number of the asynchronous machine 14, and outputs the rotational speed n, which is fed as nonlinear coupling between the two components $i_{sd}$, $i^{sq}$, of the stator current $i_{s,\phi}$ to the addition element 5096.

The second simulation unit 5048 and the third simulation unit 5050 operate independently of the rotor time constant $T_r$, which can change during operation of the asynchronous machine 14 in a temperature-dictated manner and on account of changing saturation of iron. During compensation processes of the magnetization current controller 5058, it is therefore possible to prevent a deviation between the simulated value of the magnetization current $i_{mg,\#}$ and the actual value of the magnetization current $i_{mg}$ from being able to occur. Consequently, the simulation of the field-oriented magnetization current $i_{mg,\phi\#}$ and the rotor flux linkage $\Psi_{r,\#}$ is particularly exact.

The control system 16 in accordance with a sixth exemplary embodiment is described in greater detail below and is designated by the reference sign 6016.

Figure 15:
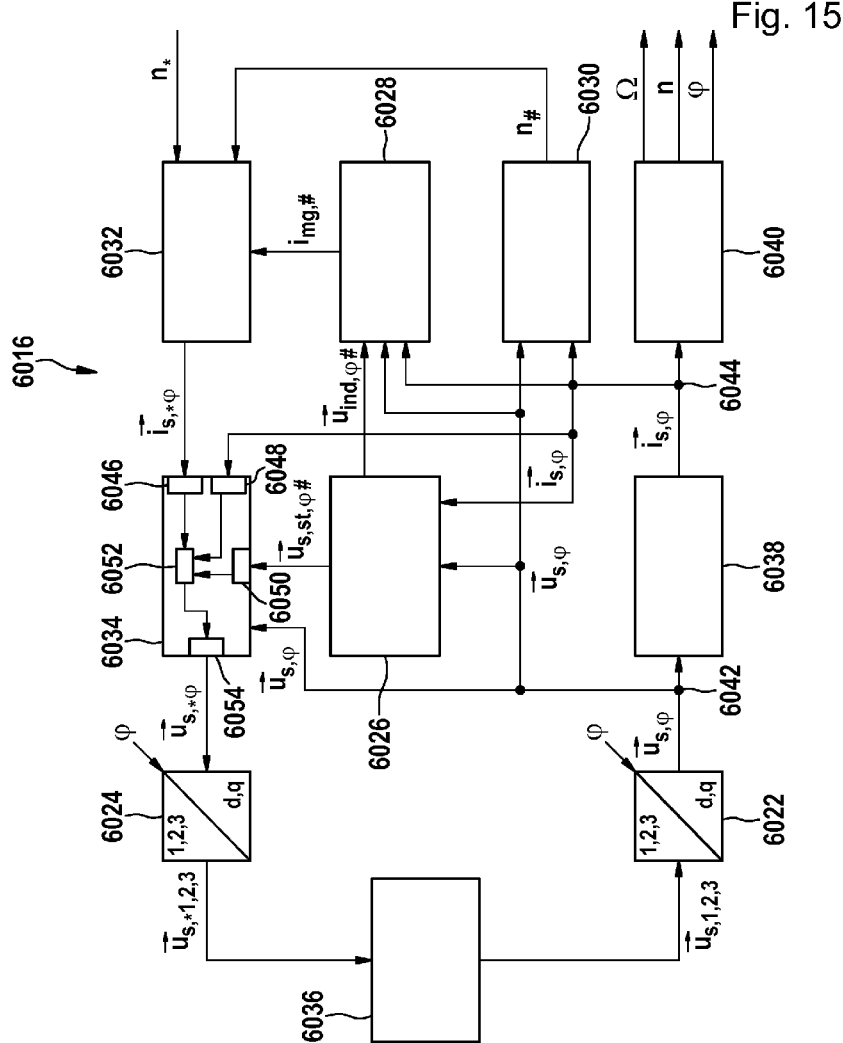
FIG. 15 shows a schematic block illustration of the control system in FIG. 1 in accordance with a sixth exemplary embodiment.

The control system 6016 illustrated in FIG. 15 comprises a first and second Park transformation unit 6022, 6024 for transforming values of vectorial variables between a stator-oriented coordinate system having mutually orthogonal coordinate axes 1, 2, 3 and a field-oriented coordinate system having mutually orthogonal coordinate axes d, q using a field angle $\phi$. The control system 6016 furthermore comprises a first simulation apparatus 6026 for simulating a field-oriented stator voltage $u_{ind,\phi\#}$ induced in a stator of the asynchronous machine 14 on account of a rotor flux $\Psi_r$ of the rotor by means of a machine model and for simulating a simulated field-oriented stator voltage $u_{s,st,\phi\#}$ required in the steady state during operation of the asynchronous machine 14 by means of the machine model, a second simulation apparatus 6028 for simulating a field-oriented magnetization current $i_{mg,\#}$ of the rotor of the asynchronous machine 14 by means of the machine model, and a third simulation apparatus 6030 for simulating a rotational speed $n_\#$ of the rotor of the asynchronous machine 14 by means of the machine model. The first, second and third simulation apparatuses 6026, 6028, 6030 operate in a simulated or modeled coordinate system defined by means of mutually orthogonal coordinate axes d#, q# and is rotated with respect to the field-oriented coordinate system by a field angle $\Delta\phi$.

In addition, the control system 6016 comprises a rotational speed control apparatus 6032 serving for controlling the rotational speed n of the rotor of the asynchronous machine 14 by means of a magnetization current control which is implemented in the rotational speed control apparatus 6032 and serves for controlling a magnetization current $i_{mg}$ of the rotor of the asynchronous machine 14, and a stator current control apparatus 6034 for controlling the current $i^{s,\phi}$ of the stator of the asynchronous machine 14 that flows in the stator. The graduated output voltage that can be output by the battery direct inverter 12 is controllable via an actuator 6036 of the control system 6016, which output voltage can be fed in at machine terminals of the asynchronous machine 14. A stator current control section 6038 of the control system 6016, which section serves for controlling a field-oriented stator current $i_{s,\phi}$ and a rotational speed control section 6040 of the control system 6016, which section serves for controlling the magnetization current $i_{mg}$ and the rotational speed n of the rotor of the asynchronous machine 14, model the asynchronous machine 14 by means of the corresponding relationships between respective input variables and output variables of the control sections 6038, 6040. A first sensor 6042 for detecting a field-oriented stator voltage $u^{s,\phi}$ of the stator of the asynchronous machine 14 and a second sensor 6044 for detecting a field-oriented stator current $i_{s,\phi}$ of the stator are in each case coupled to the first, second and third simulation apparatuses 6026, 6028, 6030 and the stator current control apparatus 6034. The stator current control apparatus 6034 can be coupled to the first sensor 6042 and the second sensor 6044.

Although the sensors 6042, 6044 are illustrated in terms of circuitry in a manner showing that the sensors 6042, 6044 are designed for detecting the field-oriented variables, it goes without saying that the sensors detect values in the stator-oriented coordinate system which are converted into corresponding variables in the field-oriented coordinate system by means of the transformation unit 6022.

The stator current control apparatus 6034 has a first interface unit 6046 for receiving a field-oriented setpoint stator current $i_{s,*\phi}$ from the rotational speed control apparatus 6032, a second interface unit 6048 for receiving the field-oriented measured stator current $i_{s,\phi}$ from the second sensor 6044, a third interface unit 6050 for receiving the simulated field-oriented stator voltage $u_{s,st,\phi\#}$ required in the steady state during operation from the first simulation unit 6026, a generating unit 6052 for generating the field-oriented setpoint stator voltage $u_{s,*\phi}$ by means of the machine model and a fourth interface unit 6054 for outputting the generated field-oriented setpoint stator voltage $u_{s,*\phi}$ to the Park transformation unit 6024.

At least one unit 6046 to 6054 of the stator current control apparatus 6034 can be realized by means of hardware and/or software. Furthermore, at least two units 6046 to 6054 of the stator current control apparatus 6034 can be realized integrally or as common code.

For the sake of completeness, it is noted that in FIG. 15 a rotational frequency of the rotor in the stator-oriented coordinate system is designated by means of $\Omega$ and a control rotational speed for the rotational speed control apparatus 6032 is designated by means of $n_*$. Furthermore, vectorial variables are identified by means of an arrow in FIGS. 15 to 18, whereas said variables are identified without an arrow in the description.

Figure 16:
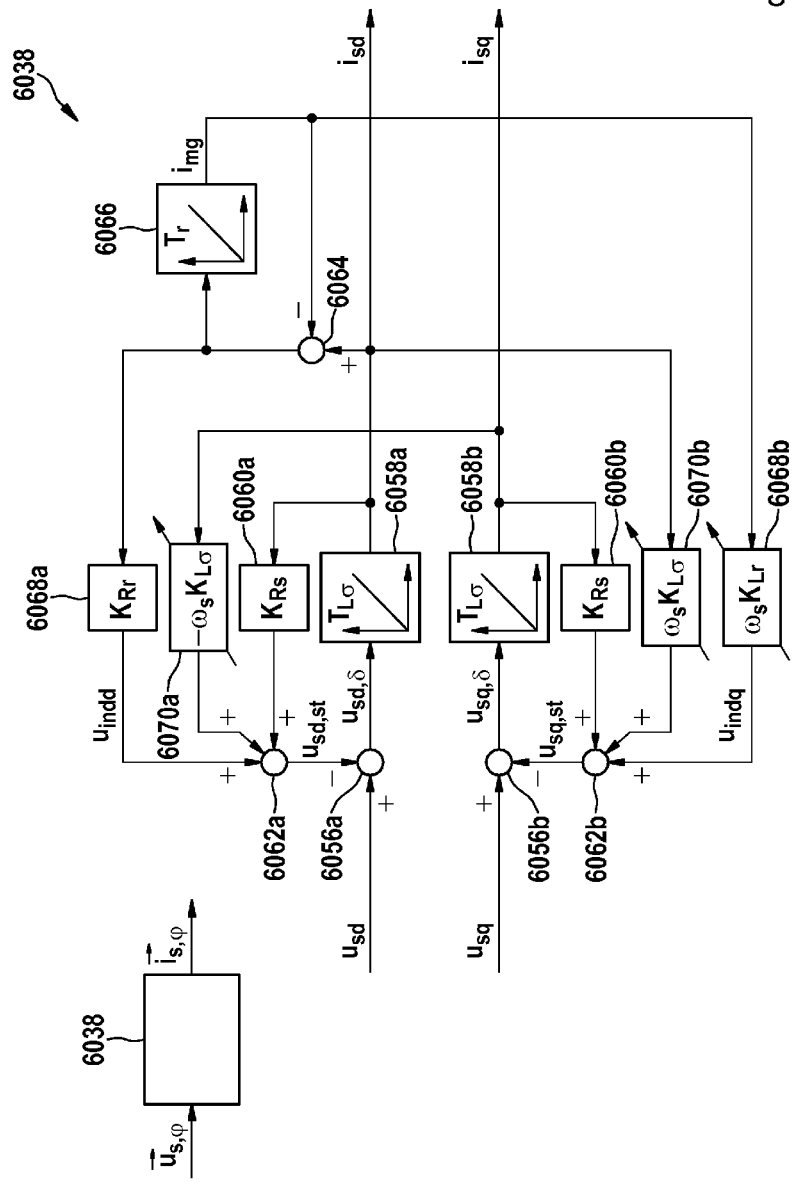
FIG. 16 shows a schematic block illustration of a stator current control section in FIG. 15.

The stator current control section 6038 illustrated in FIG. 16 elucidates a control engineering relationship between the field-oriented stator voltage $u_{s,\phi}$ and the field-oriented stator current $i^{s,\phi}$. A direct-axis component $u_{sd}$ of the field-oriented stator voltage $u^{s,\phi}$ is subjected, by means of a first subtraction element 6056a, to a disturbance in the form of a direct-axis component $u_{sd,st}$ of the stator voltage $u_{s,st,\phi}$ required in the steady state during operation. The output signal $u_{sd,\delta}$ of the first subtraction element 6056a is integrated by means of a first integration element 6058a, which has an integration constant $T_{L\sigma}$ and outputs a direct-axis component $i_{sd}$ of the field-oriented stator current $i^{s,\phi}$. In this case, the integration constant $T_{L\sigma}$ is assigned to a stator inductance. The direct-axis component $i_{sd}$ of the field-oriented stator current $i^{s,\phi}$ is fed to a first amplifying element 6060a, which multiplies a section parameter $K_{Rs}$, that is indicative of the stator resistance $R_s$ by the fed signal. An output signal of the first amplifying element 6060a is fed to an addition element 6062a, the output signal of which is the direct-axis component $u_{sd,st}$ of the field-oriented stator voltage $u_{s,st,\phi}$ required in the steady state during operation. Furthermore, the direct-axis component $i_{sd}$ of the field-oriented stator current $i^{s,\phi}$ is fed to a second subtraction element 6064, which subtracts a magnetization current $i_{mg}$ from the direct-axis component $i_{sd}$ of the field-oriented stator voltage $i^{s,\phi}$. In this case, the magnetization current $i_{mg}$ is generated by means of a second integration element 6066, which integrates the output signal of the second subtraction element 6064 with an integration constant $T_r$. The output signal of the second subtraction element 6064 is also fed to a second amplifying element 6068a, which multiplies a section parameter $K_{Rr}$ that is indicative of the rotor resistance $R_r$ by the input signal thereof and outputs as output signal a direct-axis component $u_{indd}$ of the field-oriented induced voltage $u_{ind,\phi}$, which is added to the addition element 6062a. A processing of a quadrature-axis component $u_{sq}$ of the field-oriented stator voltage $u^{s,\phi}$ is carried out in the same way as the above-described signal processing of the direct-axis component $u_{sd}$ of the field-oriented stator voltage $u^{s,\phi}$. In this case, however, the subtraction performed by means of the second subtraction element 6064 and the integration performed by means of the second integration element 6066 are not carried out and the associated components 6064, 6066 are not present in an associated signal processing portion.

A nonlinear coupling between the direct-axis component $i_{sd}$ and the quadrature-axis component $i_{sq}$ of the field-oriented stator current $i^{s,\phi}$ is generated by means of a third controllable amplifying element 6070a, which multiplies an input signal, the quadrature-axis component $i_{sq}$ of the field-oriented stator current $i_{s,\phi}$, by a section parameter $-\omega_s K_{L\sigma}$ that is indicative of a product of the stator angular frequency $\omega_s$ and the section parameter $K_{L\sigma}$, and whose output signal is fed to the addition element 6062a. The direct-axis component $i_{sd}$ of the field-oriented stator current $i_{s,\phi}$ is likewise fed to a third controllable amplifying element 6070b, which multiplies the input signal by a section parameter $\omega_s K_{L\sigma}$ whose sign is interchanged relative to the section parameter of the amplifying element 6070a. The section parameter of the third amplifying element 6070b is indicative of a product of the stator angular frequency $\omega_s$ and the section parameter $K_{L\sigma}$. An output signal of the third amplifying element 6070b is fed to the addition element 6062b.

Figure 17:
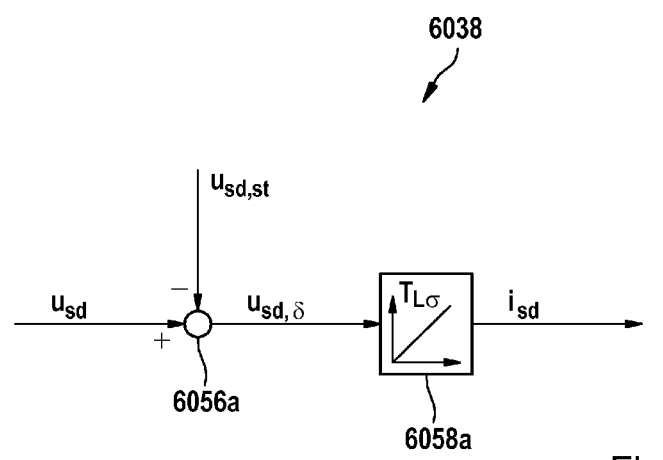
FIG. 17 shows a further schematic block illustration of the stator current control section of the control system in FIG. 15.

The stator current control section 6038 illustrated in FIG. 16 can be illustrated in a simplified manner as in FIG. 17 and have for the direct-axis and quadrature-axis components of the field-oriented stator voltage $u^{s,\phi}$ respectively the subtraction element 6056a and 6056b and the integration element 6058a, 6058b.

Figure 18:
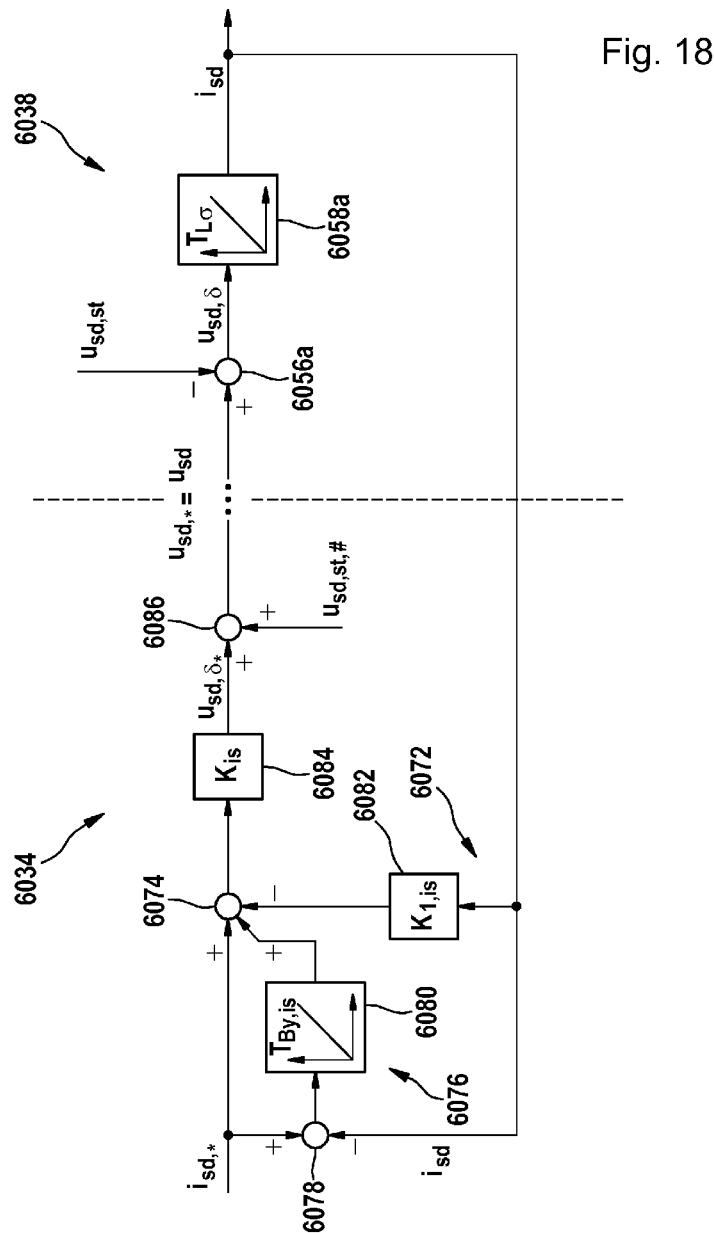
FIG. 18 shows a schematic block illustration of the stator current control apparatus and of the stator current control section of the control system in FIG. 15.

FIG. 18 shows a signal processing of the stator current control apparatus 6034 for the direct-axis component $i_{sd}$ of the field-oriented stator current $i^{s,\phi}$ and of the field-oriented stator voltage $u^{s,\phi}$, which is implemented identically for the quadrature-axis component $i_{sq}$ of the field-oriented stator current $i^{s,\phi}$. The stator current control apparatus 6034 has a feedback 6072, by means of which the direct-axis component $i_{sd}$ of the field-oriented detected stator current $i^{s,\phi}$ is fed to a combination element 6074. A bypass integrator 6076 of the stator current control apparatus 6034 has a subtraction element 6078 and an integration element 6080 having an integration constant $T_{By,is}$. By means of the subtraction element 6078, the direct-axis component $i_{sd}$ of the field-oriented detected stator current $i^{s,\Phi}$ is subtracted from the direct-axis component $i_{sd,*}$ of the field-oriented setpoint stator current $i_{s,*\phi}$. An input signal of the subtraction element 6078 is integrated by means of the integration element 6080 and is fed to the combination element 6074. The feedback 6072 is additionally provided with an amplifying element 6082, which multiplies the direct-axis component $i_{sd}$ of the field-oriented detected stator current $i^{s,\Phi}$ by a section factor $K_{1,is}$. A generated output signal of the amplifying element 6082 is fed to the combination element 6074. The combination element 6074 adds the direct-axis component $i_{sd,*}$ of the field-oriented setpoint stator current $i_{s,*\phi}$ and the output signal of the integration element 6076 and subtracts therefrom the amplified direct-axis component $i_{sd}$ of the field-oriented detected stator current $i^{s,\Phi}$ output by the first amplifying element 6082. The output signal of the combination element 6074 is fed to a second amplifying element 6084, which multiplies a section parameter $K_{is}$ by the output signal of the combination element 6074. An output signal of the amplifying element 6084 corresponds to a direct-axis component $u_{sd,\delta*}$ of a field-oriented setpoint stator voltage $u_{s,\delta*}$ dropped across a stator inductance $L_s$ and is fed to an addition element 6086, which adds the direct-axis component $u_{sd,st,\#}$ of the field-oriented stator voltage $u_{s,st,\phi\#}$ required in the steady state during operation as disturbance point injection for the stator current control section 6038 to the output signal of the second amplifying element 6084. The output signal of the addition element 6086 corresponds to the direct-axis component $u_{sd,*}$ of the field-oriented setpoint stator voltage $u_{s,*\phi}$ output by means of the fourth interface unit 6054 from FIG. 15.

In accordance with FIG. 18, the result is a reference transfer function of $$i_{sd}/i_{sd,*}=1(1pT_{is}).$$

The producible parameter $K_{1,is}$ is chosen as $K_{1,is}=1+(T_{is}/T_{By,is})$ in order to ensure an ordinal number of 1 of the reference transfer function. In this case, the adjustable parameter $K_{is}=T_{Lo}/T_{is}$ results from the timescale $T_{is}$ of the control system 6016. Consequently, the adjustment parameters of the stator current control apparatus 6034 can be determined after defining the time constant $T_{By,is}$ of the bypass integrator 6076.

Features of one of the first to sixth exemplary embodiments of the control system 1016, 2016, 3016, 4016, 5016, 6016 can be combinable in each case with features of another exemplary embodiment of the control system 1016, 2016, 3016, 4016, 5016, 6016. By way of example, the stator current control section 1038, 3038, 4038, 5030 can be embodied like the stator current control section 2038 or 6038.

It goes without saying that the stator current control section 1038, 2038, 3038, 4038, 5030, 6038 and the rotational speed control section 1040, 2040, 3040, 4040, 5032, 6040 which model the asynchronous machine 14 can be regarded as part of the control system 1016, 2016, 3016, 4016, 5016, 6016 or separate from the control system 1016, 2016, 3016, 4016, 5016, 6016, that is to say not as part of the control system 1016, 2016, 3016, 4016, 5016, 6016. In this context, it is furthermore noted that the variables n and ϕ output by the rotational speed control section 1040, 2040, 3040, 4040, 5032, 6040 can represent physical variables, while the corresponding simulated or modeled variables n# and ϕ# that are generated by means of the current by corresponding simulation apparatus 1030, 2030, 3030, 4030, 5042, 6030 can be regarded as calculated variables. The equivalent circuit diagram shown in FIG. 3 can serve as a basis for the sixth exemplary embodiment of the control system 6016 and/or can be regarded as a basis for the representation of the asynchronous machine 14 by means of the stator current control section 1038, 2038, 3038, 4038, 5030, 6038 and the rotational speed control section 1040, 2040, 3040, 4040, 5032, 6040.

The invention claimed is:

1. A method for operating an asynchronous machine, without a rotary encoder, the method comprising:
   determining, with a transformation device, (i) a detected field-oriented stator voltage based on a detected stator-oriented stator voltage received from a first sensor and (ii) a detected field-oriented stator current based on a detected stator-oriented stator current received from a second sensor;
   estimating, with a control unit configured to receive the detected field-oriented stator voltage and the detected field-oriented stator current, a required field-oriented stator voltage for steady state operation based on the detected field-oriented stator voltage, the detected field-oriented stator current, and a model, the estimating of the required field-oriented stator voltage at least comprising:
   integrating, with a first proportional integrator of the control unit, the detected field-oriented stator voltage over a first time with a normalization constant that is indicative of a stator inductance of the stator; and
   subtracting, with a first combination element of the control unit, the detected field-oriented stator current from the integrated field-oriented stator voltage in order to generate a field-oriented differential current; and
   controlling, with a current control unit configured to receive the estimated required field-oriented stator voltage and a setpoint for the field-oriented stator current, a field-oriented stator current of the asynchronous machine by applying graduated voltages to the asynchronous machine based on the estimated required field-oriented stator voltage and the setpoint for the field-oriented stator current.

2. The method as claimed in claim 1, the estimating of the required field-oriented stator voltage further comprising:
   amplifying, with an amplifier of the control unit, the field-oriented differential current with an adjustable gain parameter; and
   subtracting, with a second combination element of the control unit, the amplified field-oriented differential current from the field-oriented detected stator voltage prior to the integrating of the detected field-oriented stator voltage.

3. The method as claimed in claim 1, the estimating of the required field-oriented stator voltage further comprising:
   integrating, with a second proportional integrator of the control unit, the field-oriented differential current over a second time with an adjustable further normalization constant to generate the required field-oriented stator voltage; and
   subtracting, with a second combination element of the control unit, the required field-oriented stator voltage from the detected field-oriented stator voltage prior to the integrating of the field-oriented detected stator voltage.

4. The method as claimed in claim 1, wherein a first time scale on which the required field-oriented stator voltage is simulated is smaller than a second time scale on which the field-oriented stator current is controlled.

5. The method as claimed in claim 1, wherein the model is a machine model.

6. An apparatus for operating an asynchronous machine without a rotary encoder, the apparatus comprising:
- a transformation device configured to determine (i) a detected field-oriented stator voltage based on a detected stator-oriented stator voltage received from a first sensor and (ii) a detected field-oriented stator current based on a detected stator-oriented stator current received from a second sensor;
- a control unit configured to receive the detected field-oriented stator voltage and the detected field-oriented stator current, the control unit configured to estimate a required field-oriented stator voltage for steady state operation based on the detected field-oriented stator voltage, the detected field-oriented stator current, and a model, the control unit at least comprising:
  - a first proportional integrator configured to integrate the detected field-oriented stator voltage over a first time with a normalization constant that is indicative of a stator inductance of the stator; and
  - a first combination element configured to subtract the detected field-oriented stator current from the integrated field-oriented stator voltage in order to generate a field-oriented differential current; and
- a current control unit configured to receive the estimated required field-oriented stator voltage and a setpoint for the field-oriented stator current and control a field-oriented stator current of the asynchronous machine by applying graduated voltages to the asynchronous machine based on the estimated required field-oriented stator voltage and the setpoint for the field-oriented stator current.

7. The simulation apparatus as claimed in claim 6, wherein the model is a machine model.

8. The simulation apparatus as claimed in claim 6, the control unit further comprising:
- an amplifier configured to amplify the field-oriented differential current with an adjustable gain parameter; and
- a second combination element configured to subtract the amplified field-oriented differential current from the field-oriented detected stator voltage prior to the integrating of the detected field-oriented stator voltage.

9. The simulation apparatus as claimed in claim 6, the control unit further comprising:
- a second proportional integrator configured to integrate the field-oriented differential current over a second time with an adjustable further normalization constant to generate the required field-oriented stator voltage; and
- a second combination element configured to subtract the required field-oriented stator voltage from the detected field-oriented stator voltage prior to the integrating of the field-oriented detected stator voltage.

* * * * *